United States Patent
Kojima et al.

(10) Patent No.: US 12,147,910 B2
(45) Date of Patent: Nov. 19, 2024

(54) INFORMATION PROCESSING DEVICE, CONTROL METHOD OF INFORMATION PROCESSING DEVICE, AND STORAGE MEDIUM

(71) Applicant: Landmark Technology Corporation, Tokyo (JP)

(72) Inventors: Masaki Kojima, Tokyo (JP); Toshiaki Kasai, Tokyo (JP)

(73) Assignee: LANDMARK TECHNOLOGY CORPORATION, Tokyo (JP)

( * ) Notice: Subject to any disclaimer, the term of this patent is extended or adjusted under 35 U.S.C. 154(b) by 1154 days.

(21) Appl. No.: 16/936,774

(22) Filed: Jul. 23, 2020

(65) Prior Publication Data

US 2020/0356879 A1    Nov. 12, 2020

Related U.S. Application Data

(63) Continuation of application No. PCT/JP2018/003134, filed on Jan. 31, 2018.

(51) Int. Cl.
*G06F 16/20* (2019.01)
*G06F 16/23* (2019.01)
(Continued)

(52) U.S. Cl.
CPC ........... *G06N 5/04* (2013.01); *G06F 16/2322* (2019.01); *G06F 16/58* (2019.01); *G06N 20/00* (2019.01)

(58) Field of Classification Search
CPC .. G06F 16/2322; G06F 16/58; G06F 2111/12; G06F 2113/16; G06F 30/20; G06N 20/00; G06N 5/04
See application file for complete search history.

(56) References Cited

U.S. PATENT DOCUMENTS 6,327,584 B1 * 12/2001 Xian ................... G06F 16/1873
7,176,942 B2 *  2/2007 Chartier .................. G06T 19/20
                                                                345/619
(Continued)

FOREIGN PATENT DOCUMENTS

JP          9-305577 A     11/1997
JP         10-21282 A       1/1998
JP       2002-259468 A     9/2002

OTHER PUBLICATIONS

International Search Report dated Mar. 27, 2018, issued in counterpart application No. PCT/JP2018/003134, w/ English translation (2 pages).

(Continued)

*Primary Examiner* — Mahesh H Dwivedi
(74) *Attorney, Agent, or Firm* — WHDA, LLP

(57) ABSTRACT

A device comprises determining, if an instruction to open a first drawing file is accepted, whether the first drawing file and a second drawing file associated with the first drawing file have been edited at the same time; determining whether the second drawing file has been edited after previous editing of the first drawing file; determining, if the first drawing file and the second drawing file have been edited at the same time or if they have not been edited at the same time but the second drawing file has been edited after the previous editing of the first drawing file, whether there is a difference between attributes of identical drawing elements included in the respective drawing files; and executing, if there is a difference between the attributes, attribute change processing on the first drawing file.

11 Claims, 22 Drawing Sheets

(51) Int. Cl.
*G06F 16/58* (2019.01)
*G06N 5/04* (2023.01)
*G06N 20/00* (2019.01)

(56) References Cited

U.S. PATENT DOCUMENTS

| | | | | |
|---|---|---|---|---|
| 8,732,599 | B2* | 5/2014 | Reghetti | G06T 19/20 |
| | | | | 715/765 |
| 2003/0115217 | A1* | 6/2003 | Klug | H04L 67/025 |
| 2004/0205663 | A1* | 10/2004 | Mohamed | G06F 40/166 |
| | | | | 715/255 |
| 2013/0227396 | A1* | 8/2013 | Chinnathambi | G06F 8/38 |
| | | | | 715/234 |
| 2016/0224691 | A1 | 8/2016 | Maddukuri | |
| 2020/0272700 | A1* | 8/2020 | Tardie | G06F 30/00 |

OTHER PUBLICATIONS

Written Opinion dated Mar. 27, 2018, issued in counterpart application No. PCT/JP2018/003134 (4 pages).

* cited by examiner

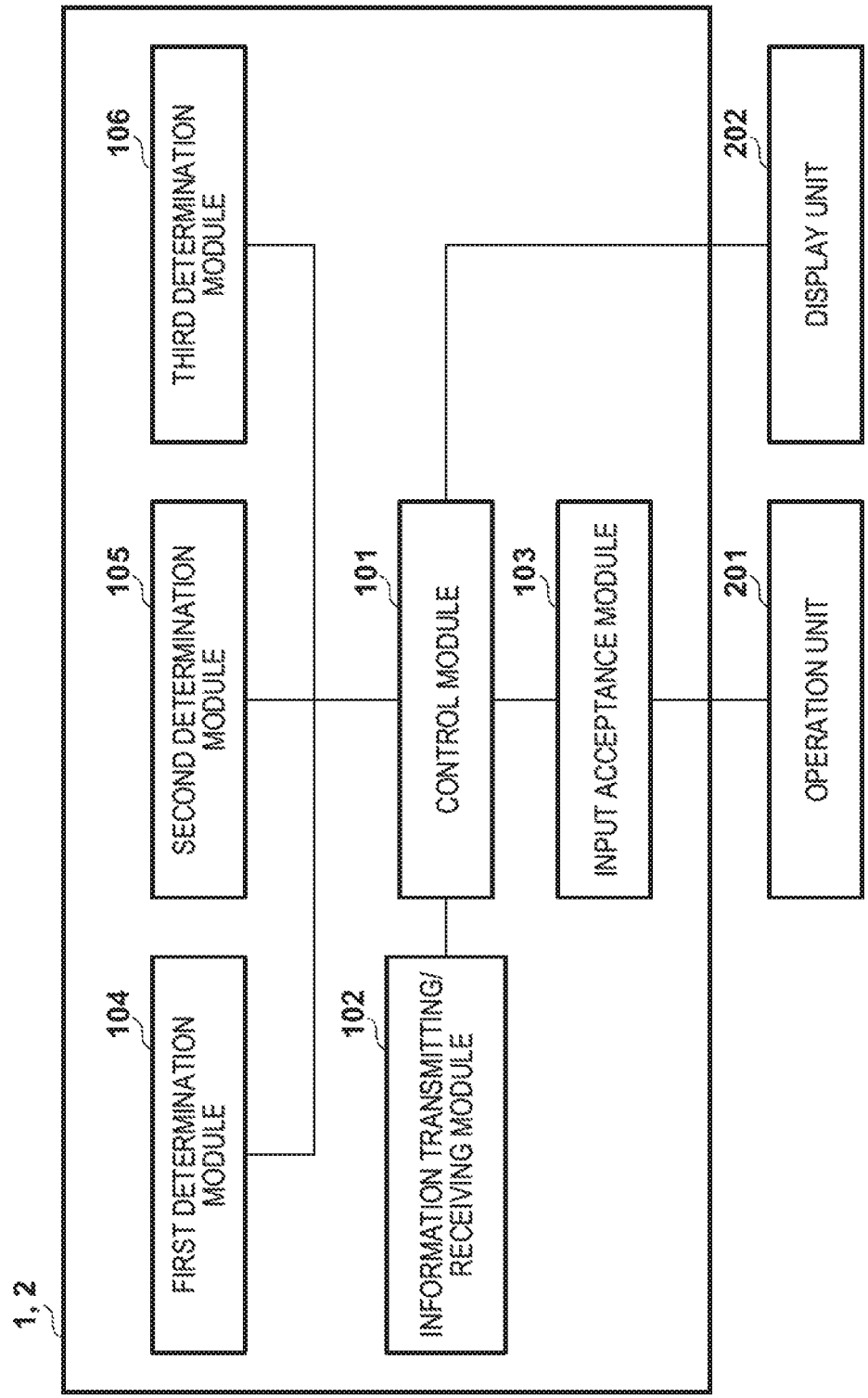

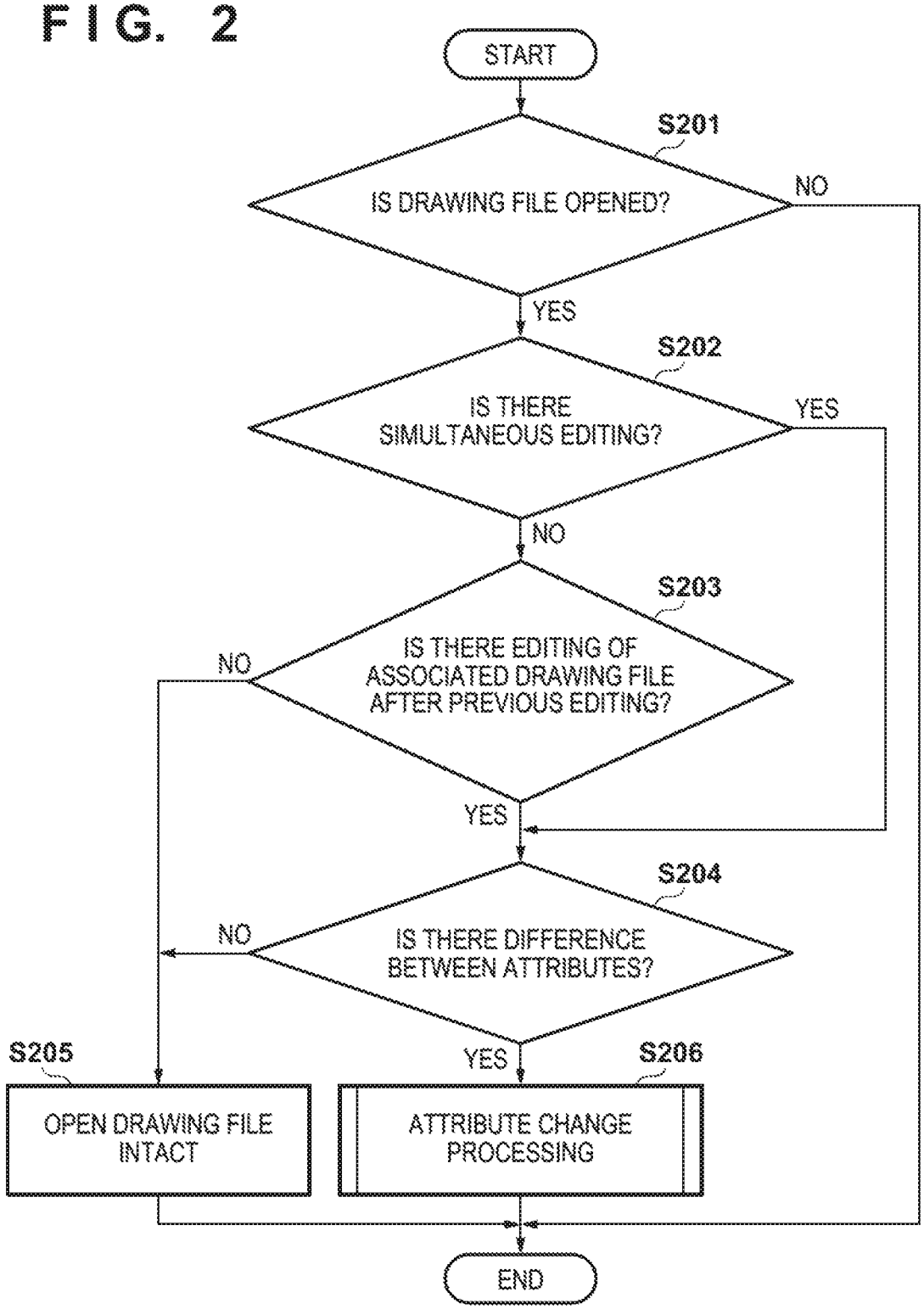

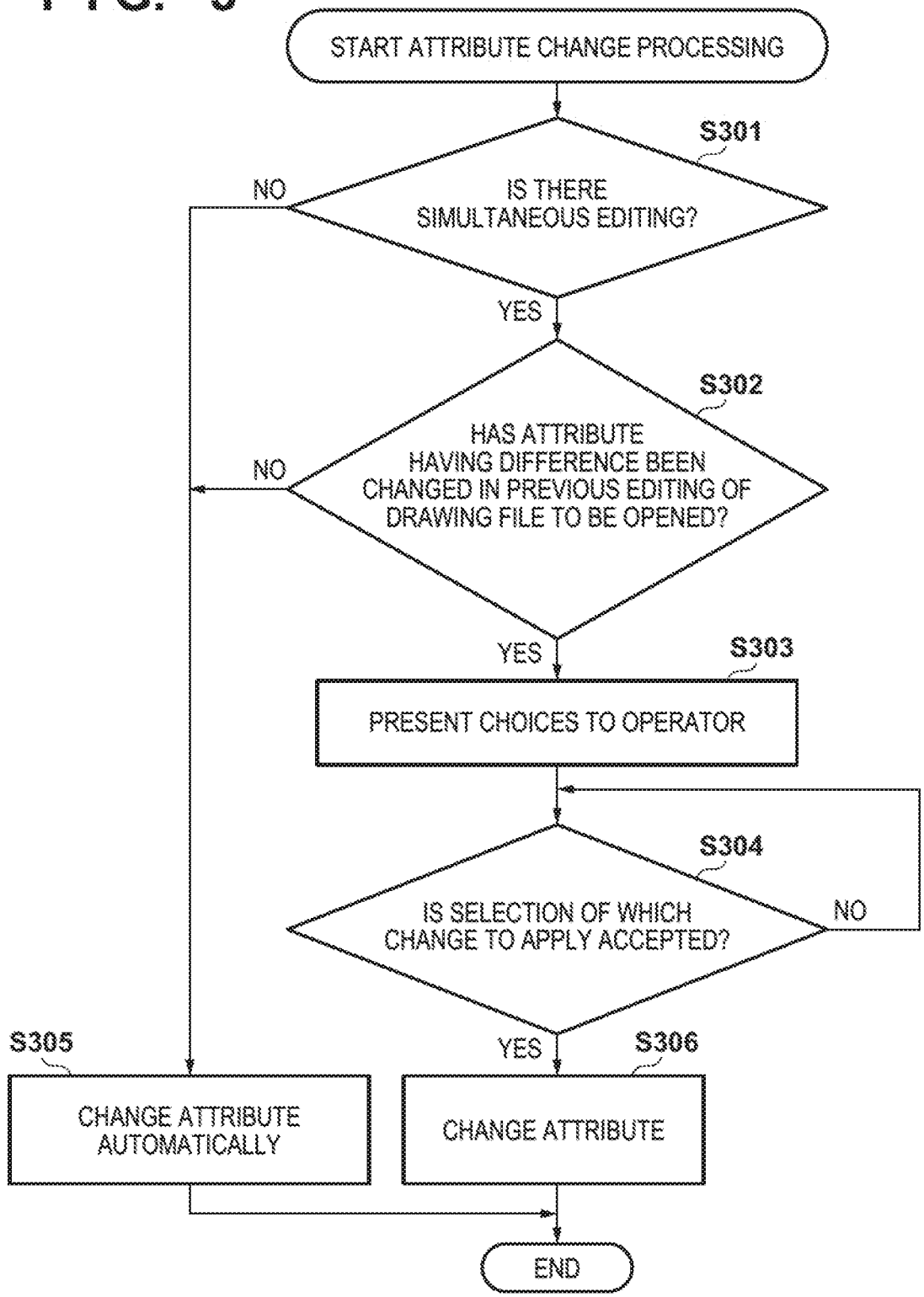

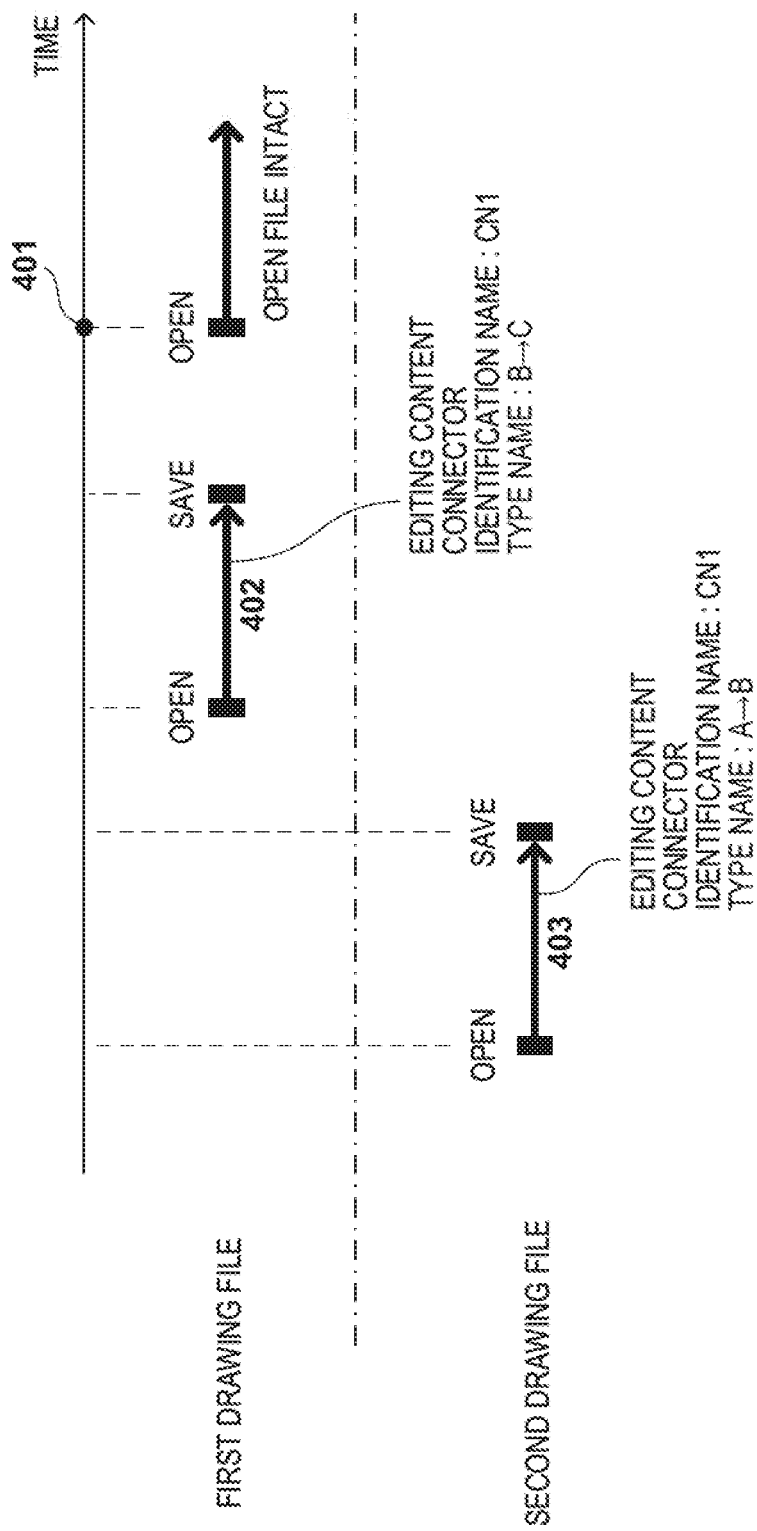

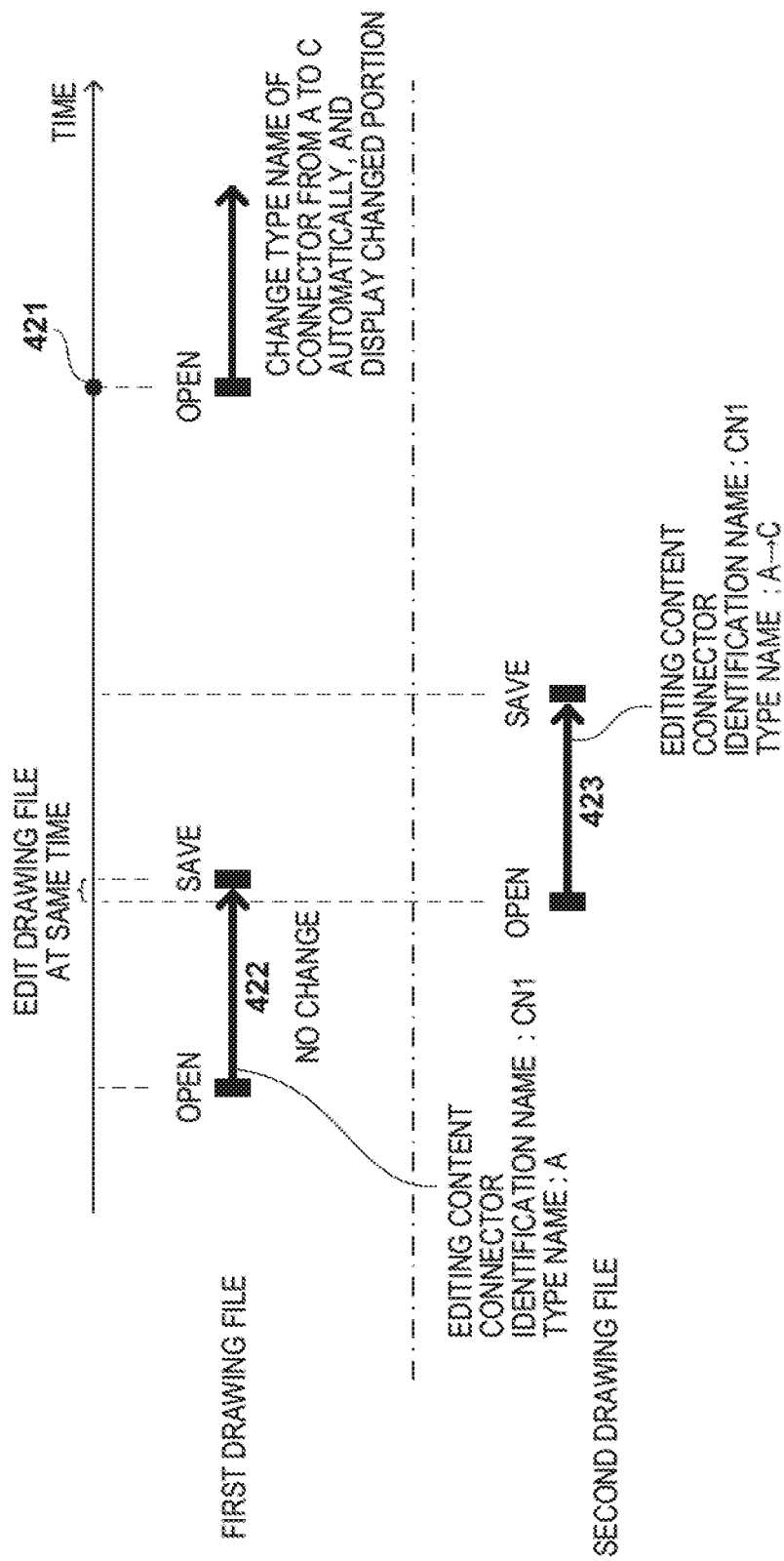

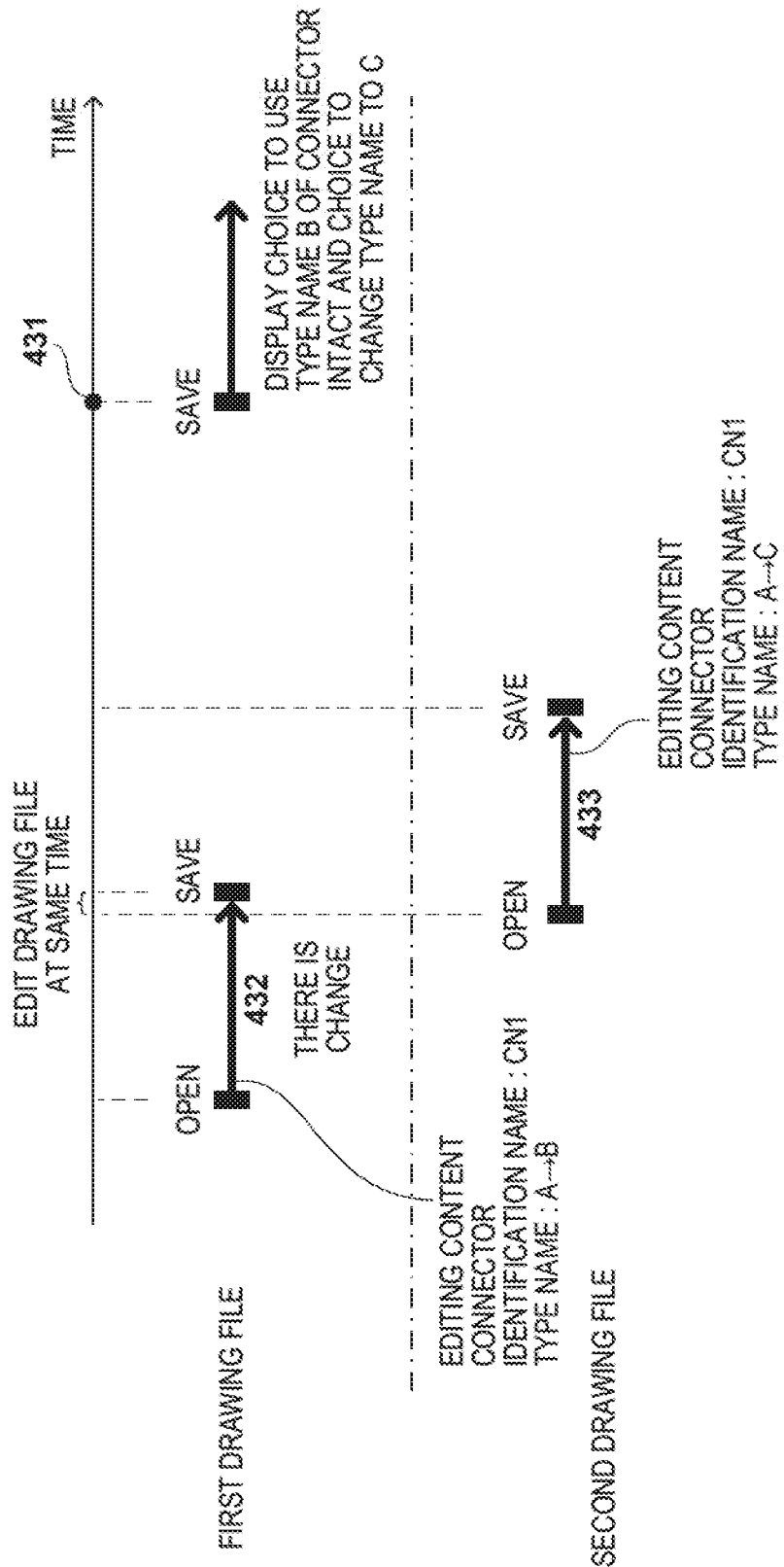

FIG. 7

UPDATED VALUE SELECTION

CONFLICT AMONG PLURALITY OF DRAWING EDITING APPLICATIONS ON NEXT DRAWING ELEMENT UPDATE.
CONNECTOR IDENTIFICATION NAME CN1
PLEASE SELECT ONE UPDATED VALUE AND PRESS APPLY BUTTON.

| UPDATED VALUE | UPDATED DRAWING EDITING APPLICATION | SELECT |
|---|---|---|
| B | DRAWING EDITING APPLICATION OF CABLE ASSEMBLY DIAGRAM | ✓ |
| C | DRAWING EDITING APPLICATION OF 3D HARNESS MODEL | ☐ |

APPLY    CANCEL

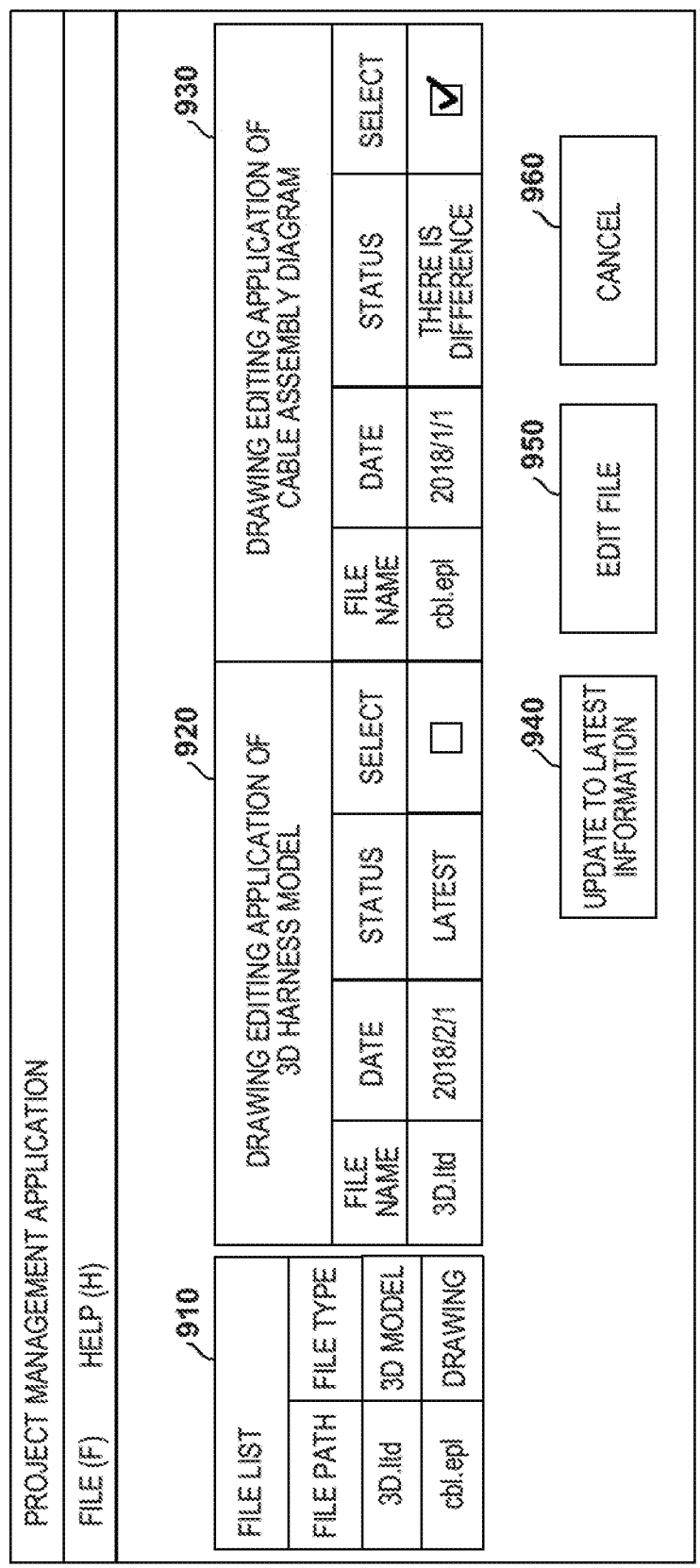

INFORMATION PROCESSING DEVICE, CONTROL METHOD OF INFORMATION PROCESSING DEVICE, AND STORAGE MEDIUM

CROSS-REFERENCE TO RELATED APPLICATION(S)

This application is a continuation of International Patent Application No. PCT/JP2018/003134 filed on Jan. 31, 2018, the entire disclosures of which is incorporated herein by reference.

TECHNICAL FIELD

The present invention relates to an information processing device, a control method of the information processing device, and a storage medium, and more specifically, a technique for maintaining the consistency between a plurality of mutually associated design drawings.

BACKGROUND ART

In general, an electric manufacturer creates a harness manufacturing drawing (to be referred to a harness diagram hereinafter) to manufacture a cable or a wire harness (to be referred to as a harness hereinafter) used in a product. The harness diagram is designed by stepwisely creating respective drawing files. First, a drawing file such as a wiring table, an overall wiring diagram, or a block diagram in which equipments are connected with lines is created. Then, based on the connection information defined in the wiring table, the overall wiring diagram, or the block diagram, a wiring route is determined on a prototype and the harness length and branch point are defined. Finally, a harness diagram is created based on the harness length and branch point determined on the prototype.

In recent years, instead of a prototype, a wiring route may be examined on 3D-CAD to create a 3D harness model. In this case, a method of automatically generating a harness diagram from the 3D harness model created on 3D-CAD is also used. For example, PTL 1 discloses a harness diagram creation device that creates a two-dimensional electric wiring diagram for a board based on data of a three-dimensional board assembly diagram created on a computer.

Here, if there is a defect when the harness manufactured based on the harness diagram is assembled to the housing, the work of correcting the harness diagram and manufacturing the harness again occurs. At this time, in order to maintain the consistency, it is necessary to reflect the correction on each drawing file (a wiring table, an overall wiring diagram, a block diagram, or a 3D harness model) from which the harness diagram has been created.

CITATION LIST

Patent Literature

PTL 1: Japanese Patent Laid-Open No. 10-21282

SUMMARY OF INVENTION

Technical Problem

However, it is possible to forget to update each drawing file other than the harness diagram as in the harness diagram. If the drawing file in the upstream process is not updated so the consistency between the drawing files is not maintained, it becomes difficult to find the latest drawing file. If the old drawing file is updated, new information can be deleted. Therefore, the conventional technique has a problem that it is difficult to maintain the consistency between mutually associated drawing files.

The present invention has been made in consideration of the above-described problem, and has as its object to provide a technique for maintaining the consistency between mutually associated drawing files.

Solution to Problem

In order to achieve the object described above, an information processing device according to one aspect of the present invention includes an arrangement described below. That is, the information processing device is an information processing device comprising: a first determination unit configured to determine, if an instruction to open a first drawing file is accepted, whether the first drawing file and a second drawing file associated with the first drawing file have been edited at the same time; a second determination unit configured to determine whether the second drawing file has been edited after previous editing of the first drawing file; a third determination unit configured to determine, if the first drawing file and the second drawing file have been edited at the same time or if the first drawing file and the second drawing file have not been edited at the same time but the second drawing file has been edited after the previous editing of the first drawing file, whether there is a difference between attributes of identical drawing elements included in the respective drawing files; and a control unit configured to execute, if there is a difference between the attributes, attribute change processing on the first drawing file.

Advantageous Effects of Invention

According to the present invention, it becomes possible to maintain the consistency between mutually associated drawing files.

Other features and advantages of the present invention will become apparent from the description provided hereinafter with reference to the accompanying drawings. Note that the same reference numerals denote the same or similar components in the accompanying drawings.

BRIEF DESCRIPTION OF DRAWINGS

The accompanying drawings are included in and constitute a part of the specification, illustrate embodiments of the present invention and, together with the description, serve to explain the principles of the present invention.

FIG. 1B is a block diagram showing an arrangement example of an information processing device according to the embodiment of the present invention;

FIG. 2 is a flowchart illustrating a procedure of the overall process executed by the information processing device according to the embodiment of the present invention;

FIG. 3 is a flowchart illustrating a procedure of attribute change processing executed by the information processing device according to the embodiment of the present invention;

FIG. 4A is a view for explaining a case in which synchronization between drawing files is not performed according to the embodiment of the present invention;

FIG. 4C is a view for explaining another case in which synchronization between drawing files is performed according to the embodiment of the present invention;

FIG. 4D is a view for explaining still another case in which synchronization between drawing files is performed according to the embodiment of the present invention;

FIG. 7 is a view showing a display example of attribute choices according to the embodiment of the present invention;

FIG. 9 is a view showing a display example of the project management application according to the embodiment of the present invention.

DESCRIPTION OF EMBODIMENTS

Figure 1A:
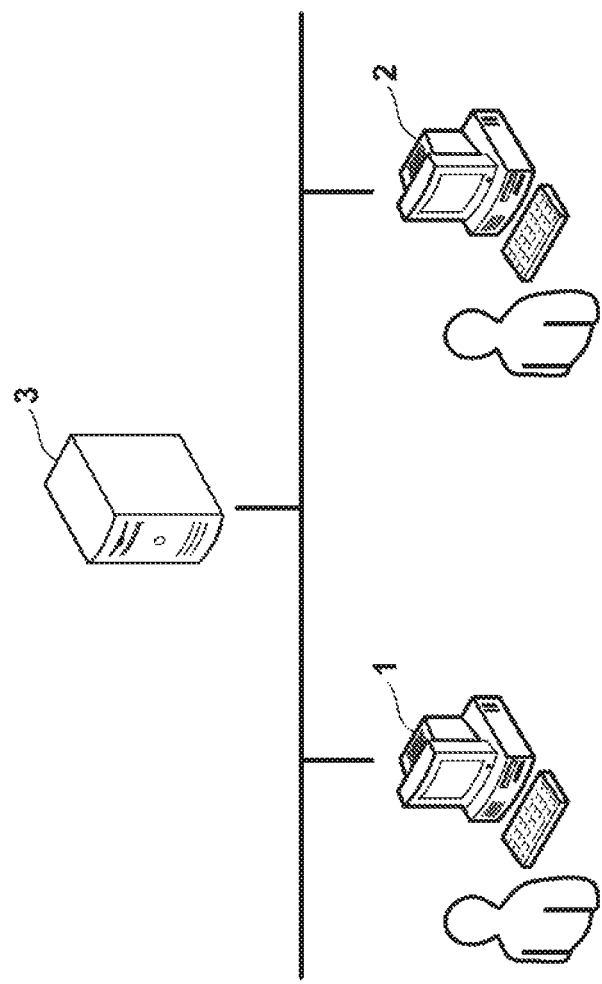
FIG. 1A is view showing a configuration example of an information processing system according to an embodiment of the present invention.

Hereinafter, respective embodiments of the present invention will be explained with reference to the accompanying drawings. Note that the same reference numerals denote the same components through the accompanying drawings.

<Definitions>

In this specification, a drawing is a drawing necessary for manufacturing a cable or a wire harness of a product. More specifically, it is a wiring table, an overall wiring diagram, a block diagram, a 3D harness model, a cable assembly diagram, a harness diagram, or the like. Here, a cable assembly is a group of mainly continuously connected connectors and cables, and a cable assembly diagram is a drawing showing a cable assembly. A harness is a group of members such as connectors and cables regardless of whether they are continuously connected, and a harness diagram is a drawing showing a harness. A harness can include a plurality of cable assemblies. For example, a cable assembly diagram is a drawing including a cable group including three connectors and two cables connecting them, and another cable assembly diagram is a drawing including a cable group including two connectors and one cable connecting them. A harness diagram is a diagram including these cable groups, for example. A drawing file is a file of a drawing, and is configured as a separate file for each drawing type. A drawing file editing application is an application for editing a drawing file. Editing is performed using a different application for each drawing type. For example, an editing application for a 3D harness model is called a 3D harness model editing application, and an editing application for a cable assembly diagram is called a cable assembly diagram editing application.

A project file is a file that includes a list of drawing files necessary for manufacturing a cable or a wire harness of one product. A project management application is an application that can register or delete a drawing file in a project file. A drawing element is an element such as a connector or a cable included in a drawing. Other examples of the drawing element include a substrate, a path/path segment, a path point, a contact, a tube, a fastener, and a wire.

A drawing element has a plurality of attributes. The attributes are the identification name, the type name, and the like of the drawing element. An info file is a file obtained by extracting an element desired to be synchronized between drawings from drawing elements included in a drawing file. For example, an info file of the 3D harness model does not include the 3D shape which is unnecessary for synchronization, but includes an element such as a connector or a cable serving as a drawing element necessary for synchronization and its attributes. The info file is created as a pre-editing info file and a post-editing info file at the start and end of editing of a drawing file, respectively.

An associated drawing file is a drawing file associated with a drawing file to be opened, and more specifically, is a drawing file registered in the project file other than a drawing file to be opened. Previous editing refers to the latest editing performed before the opening timing of a drawing file to be opened. Simultaneous editing means that the editing times of a plurality of mutually associated drawing files are overlapped with each other.

<Configuration of Information Processing System>

First, with reference to FIG. 1A, an example of the configuration of an information processing system according to an embodiment of the present invention will be described. The information processing system is configured to include an information processing device 1, an information processing device 2, and a server 3. In this embodiment, an operator who operates the information processing device 1 edits a first drawing file, and an operator who operates the information processing device 2 edits a second drawing file associated with the first drawing file. Each of the information processing devices 1 and 2 is, for example, a personal computer.

The first drawing file is, for example, a 3D harness model file, and the second drawing file is, for example, a cable assembly diagram file. When the attribute (for example, the type name or the like) of a common drawing element (a drawing element (a connector, a cable, or the like) with the same identification name) is changed by editing one drawing file, it becomes different from the attribute in the other drawing file, so that synchronization is required.

The server 3 manages info files each of which is a file obtained by extracting an element desired to be synchronized between drawings from drawing elements included in the drawing file. A pre-editing info file and a post-editing info file automatically created at the start and end of editing of a drawing file, respectively, are acquired and managed for each drawing file. By acquiring a required info file from the server 3, each of the information processing devices 1 and 2 can determine whether there is a difference between the attributes of the drawing elements included in the respective drawing files.

<Arrangement of Information Processing Device>

Next, with reference to FIG. 1B, an example of the software arrangement of the information processing device according to the embodiment of the present invention will be described. An operation of each processing module included in the information processing device can be implemented by a CPU (not shown) reading out a program stored in a memory (not shown) and executing the program. In this embodiment, the information processing devices 1 and 2 have the common arrangement.

Each of the information processing devices 1 and 2 includes a control module 101, an information transmitting/receiving module 102, an input acceptance module 103, a first determination module 104, a second determination module 105, and a third determination module 106. In addition, each of the information processing devices 1 and 2 is connected to an operation unit 201 and a display unit 202. The operation unit 201 is, for example, an input device such as a mouse or a keyboard. The display unit 202 is a display such as an LCD. Note that each of the information processing devices 1 and 2 may be configured to include the operation unit 201 and the display unit 202.

The control module 101 controls the overall operation of the information processing device 1 or 2, and executes attribute change processing on a drawing file. The information transmitting/receiving module 102 can transmit/receive, to/from the server 3, information of an info file which is a file obtained by extracting an element desired to be synchronized between drawings from drawing elements included in the drawing file. The input acceptance module 103 accepts an instruction input from the operator operating the operation unit 201.

The first determination module 104 determines, if an instruction to open the first drawing file is accepted, whether the first drawing file and the second drawing file associated with the first drawing file have been edited at the same time. The second determination module 105 determines whether the second drawing file has been edited after previous editing of the first drawing file. The third determination module 106 determines, if the first drawing file and the second drawing file have been edited at the same time or if the first drawing file and the second drawing file have not been edited at the same time but the second drawing file has been edited after the previous editing of the first drawing file, whether there is a difference between the attributes of identical drawing elements included in the respective drawing files. The details of the processing of each determination module will be described later.

<Summary of Synchronization>

In designing of a product, each of a plurality of operators usually edits a drawing file using an information processing device, but at this time, it is necessary to synchronize the drawing files. Here, synchronization means a function of, when a drawing file in a project file is opened, automatically applying a change in attribute in an associated drawing file associated with the drawing file, or presenting change candidates to prompt the operator to make a selection and executing attribute change processing in accordance with the selection made by the operator.

When the synchronization is performed, any one of following three processing operations is executed.

(1) It is unnecessary to change the attribute, and the file is opened intact.

(2) It is necessary to change the attribute, and the attribute is automatically changed. Further, the changed portion is notified to the operator.

(3) The attribute may need to be changed, and change choices are presented to the operator. In accordance with the selection made by the operator, change processing is executed.

<Processing>

Regarding these processing operations, a procedure of the process executed by the information processing device according to the embodiment of the present invention will be described with reference to FIGS. 2, 3, 4A to 4D, and 5. In FIGS. 2 and 3, a description will be given assuming that the information processing device 1 executes the process.

In step S201 of FIG. 2, the control module 101 determines, based on an input from the input acceptance module 103, whether the operator of the information processing device 1 is trying to open the first drawing file. If the operator is trying to open the first drawing file, the process advances to step S202. On the other hand, if the operator is not trying to open the first drawing file, the process is terminated.

In step S202, the first determination module 104 determines whether the associated drawing file (for example, the second drawing file associated with the first drawing file) includes a drawing file that has been edited at the same time as the first drawing file. That is, it is determined whether the first drawing file and the second drawing file associated with the first drawing file have been edited at the same time. If there is a drawing file that has been edited at the same time, the process advances to step S204. On the other hand, if there is no drawing file that has been edited at the same time, the process advances to step S203.

In step S203, the second determination module 105 determines whether the associated drawing file (for example, the second drawing file) has been edited after previous editing of the first drawing file. If the associated drawing file has been edited, the process advances to step S204. On the other hand, if the associated drawing file has not been edited, the process advances to step S205.

In step S204, the third determination module 106 determines whether there is a difference between the attributes of identical drawing elements included in the respective drawing files. If there is a difference, it is necessary to change the attribute in the first drawing file, so that the process advances to step S206. On the other hand, if there is no difference, the process advances to step S205.

In step S205, the control module 101 executes processing of opening, intact, the first drawing file to be opened. In step S206, the control module 101 executes attribute change processing on the first drawing file. The details of this processing will be described with reference to FIG. 3. Thus, a sequence of processing shown in FIG. 2 is terminated.

Next, the details of the attribute change processing in step S206 of FIG. 2 will be described with reference to FIG. 3. In step S301 of FIG. 3, the first determination module 104 determines whether the associated drawing file (for example, the second drawing file) includes a drawing file that has been edited at the same time as the first drawing file. That is, it is determined whether the first drawing file and the second drawing file associated with the first drawing file have been edited at the same time. The processing in step S301 is similar to the processing in step S202. If there is a drawing file that has been edited at the same time, the process advances to step S302. On the other hand, if there is no drawing file that has been edited at the same time, the process advances to step S305.

In step S302, the control module 101 determines whether the attribute having the difference has been changed in the previous editing of the first drawing file to be opened. If the attribute has been changed, the process advances to step S303. On the other hand, if the attribute has not been changed, the process advances to step S305.

In step S303, the control module 101 presents choices to the operator of the information processing device 1. More specifically, it controls the display unit 202 to display a choice to apply the attribute changed in the previous editing of the first drawing file as the attribute of the change candidate and a choice to apply the attribute changed in the associated drawing file (for example, the second drawing file).

In step S304, the control module 101 determines, based on an input from the input acceptance module 103, whether a selection of one of the choice to apply the change in the first drawing file and the choice to apply the change in the associated drawing file (for example, the second drawing file) is accepted. At this time, the operator makes the selection by operating the operation unit 201. If the selection is accepted, the process advances to step S306. If no selection is accepted, the control module 101 waits until the selection is accepted.

In step S305, the control module 101 automatically executes the attribute change processing. In addition, the changed portion is displayed on the display unit 202 to inform the operator of the changed portion and prompt confirmation. In step S306, the control unit 101 executes, in accordance with the selection in the step S304, the attribute change processing by applying the change in the selected drawing file. Thus, a sequence of processing shown in FIG. 3 is terminated.

<Cases>

Next, specific cases of the processing shown in FIGS. 2 and 3 will be described with reference to FIGS. 4A to 4D.

FIG. 4A shows an example in which the drawing file to be opened is opened intact. In FIG. 4A, the operator of the information processing device 1 is trying to open the first drawing file at time 401. In previous editing 402, the type name serving as the attribute of a connector (identification name: CN1) serving as the drawing element in the first drawing file has been changed from B to C.

The second drawing file associated with the first drawing file has been edited by the operator of the information processing device 2 in editing 403 performed before editing 402. In the editing 403, the type name serving as the attribute of a connector (identification name: CN1) serving as the drawing element in the second drawing file has been changed from A to B. Here, it can be recognized that the connectors in the respective drawing files represent identical drawing elements since their identification names are CN1.

In the example shown in FIG. 4A, it is Yes in step S201 since the first drawing file is to be opened at time 401, and it is No in step S202 since there is no simultaneous editing. Further, it is No in step S203 since the associated drawing file (the second drawing file) has not been edited after the previous editing, so that the process advances to step S205. Therefore, in the example shown in FIG. 4A, the first drawing file is opened intact in step S205, and the process is terminated.

Figure 4B:
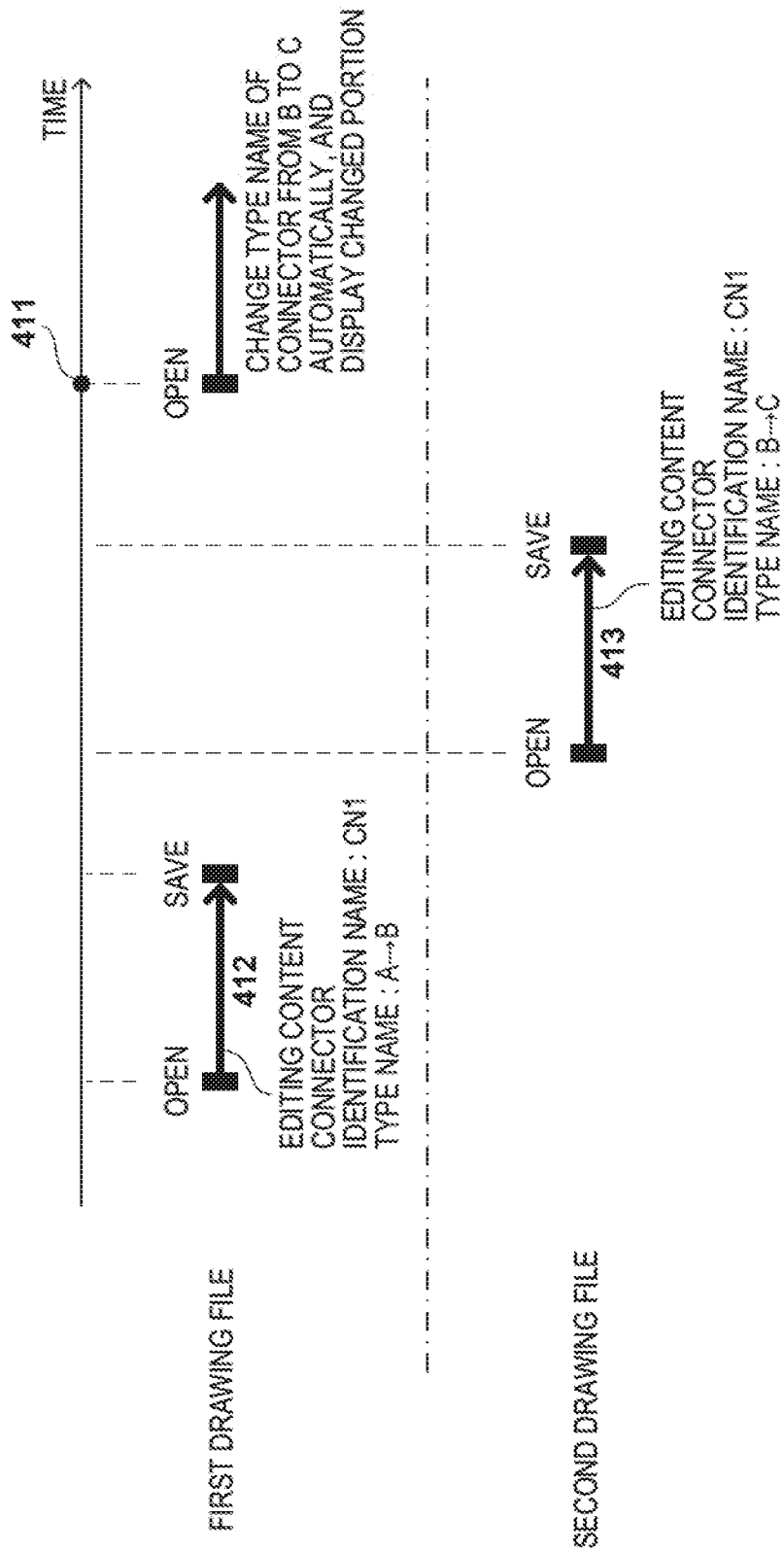
FIG. 4B is a view for explaining a case in which synchronization between drawing files is performed according to the embodiment of the present invention.

FIG. 4B shows an example in which the change in the associated drawing file is automatically reflected. In FIG. 4B, the operator of the information processing device 1 is trying to open the first drawing file at time 411. In previous editing 412, the type name serving as the attribute of a connector (identification name: CN1) serving as the drawing element in the first drawing file has been changed from A to B.

The second drawing file associated with the first drawing file has been edited by the operator of the information processing device 2 in editing 413 performed after editing 412. In the editing 413, the type name serving as the attribute of a connector (identification name: CN1) serving as the drawing element in the second drawing file has been changed from B to C. Here, it can be recognized that the connectors in the respective drawing files represent identical drawing elements since their identification names are CN1.

In the example shown in FIG. 4B, it is Yes in step S201 since the first drawing file is to be opened at time 411, and it is No in step S202 since there is no simultaneous editing. Further, it is Yes in step S203 since the associated drawing file (the second drawing file) has been edited after the previous editing, so that the process advances to step S204. Since the attribute (the type name) in the first drawing file is B and the attribute (the type name) in the second drawing file is C, there is a difference between the attributes, so that it is Yes in step S204 and the process advances to step S206. Then, in FIG. 3, it is No in step S301 since there is no simultaneous editing, and the process advances to step S305. In step S305, the attribute in the first drawing file is automatically changed. More specifically, the update in the editing 413 of the second drawing file is applied and the type name of the connector is automatically changed from B to C. In addition, the changed portion is displayed on the display unit 202 to inform the operator and prompt confirmation.

FIG. 4C shows another example in which a change in the associated drawing file is automatically reflected. In FIG. 4C, the operator of the information processing device 1 is trying to open the first drawing file at time 421. In previous editing 422, the type name serving as the attribute of a connector (identification name: CN1) serving as the drawing element in the first drawing file has not been changed.

The second drawing file associated with the first drawing file has been edited by the operator of the information processing device 2 in editing 423 at the same time as the editing 422. In the editing 423, the type name serving as the attribute of a connector (identification name: CN1) serving as the drawing element in the second drawing file has been changed from A to C. Here, it can be recognized that the connectors in the respective drawing files represent identical drawing elements since their identification names are CN1.

In the example shown in FIG. 4C, it is Yes in step S201 since the first drawing file is to be opened at time 421, and it is Yes in step S202 since there is simultaneous editing, so that the process advances to step S204. Since the attribute (the type name) in the first drawing file is A and the attribute (the type name) in the second drawing file is C, there is a difference between the attributes, so that it is Yes in step S204 and the process advances to step S206. Then, in FIG. 3, it is Yes in step S301 since there is simultaneous editing, and it is No in step S302 since the attribute has not been changed in the editing 422, so that the process advances to step S305. In step S305, the attribute in the first drawing file is automatically changed. More specifically, the update in the editing 423 of the second drawing file is applied and the type name of the connector is automatically changed from A to C. In addition, the changed portion is displayed on the display unit 202 to inform the operator and prompt confirmation.

FIG. 4D shows an example in which change choices are presented when there are a plurality of change candidates. In FIG. 4D, the operator of the information processing device 1 is trying to open the first drawing file at time 431. In previous editing 432, the type name serving as the attribute of a connector (identification name: CN1) serving as the drawing element in the first drawing file has been changed from A to B.

The second drawing file associated with the first drawing file has been edited by the operator of the information processing device 2 in editing 433 at the same time as the editing 432. In the editing 433, the type name serving as the attribute of a connector (identification name: CN1) serving as the drawing element in the second drawing file has been changed from A to C. That is, the attributes (the type names) have been changed in both drawing files. Here, it can be recognized that the connectors in the respective drawing files represent identical drawing elements since their identification names are CN1.

In the example shown in FIG. 4D, it is Yes in step S201 since the first drawing file is to be opened at time 431, and it is Yes in step S202 since there is simultaneous editing, so that the process advances to step S204. Since the attribute (the type name) in the first drawing file is B and the attribute (the type name) in the second drawing file is C, there is a difference between the attributes, so that it is Yes in step S204 and the process advances to step S206. Then, in FIG. 3, it is Yes in step S301 since there is simultaneous editing, and it is Yes in step S302 since the attribute has been changed in the editing 432, so that the process advances to step S303. In step S303, the control module 101 causes the display unit 202 to display a choice to use the attribute (the type name) B of the connector intact and a choice to change the attribute to C. In step S304, the operator of the information processing device 1 selects one of the choices displayed on the display unit 202 to select the attribute (the type name) B or C to be applied. The operator makes the selection by operating the operation unit 201. Then, in step S306, the control module 101 changes the attribute in the first drawing file in accordance with the selection. More specifically, if B is selected, B is used intact as the type name of the connector. If C is selected, the type name of the connector is changed to C. In addition, the changed portion is displayed on the display unit 202 to inform the operator of the changed portion and prompt confirmation.

<Method of Determining Simultaneous Editing>

Here, with reference to FIG. 5, an example of a method of determining whether the respective drawing files have been edited at the same time will be described. The control module 101 automatically creates a pre-editing info file and a post-editing info file at the start and end of editing of each drawing file, respectively. The info-file is a file obtained by extracting an element desired to be synchronized between drawings from drawing elements included in the drawing file. The information of the info file includes the drawing element and the attributes (the identification name and the type name).

Figure 5:
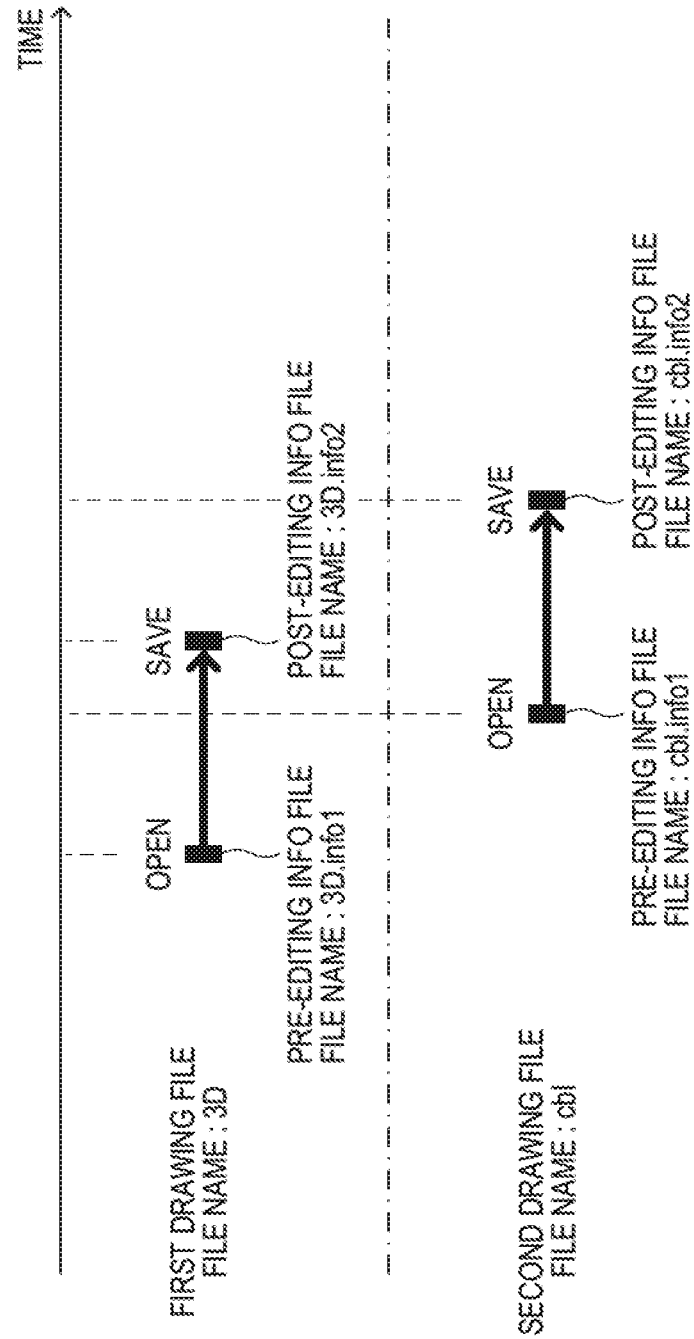
FIG. 5 is a view for explaining a method of determining presence/absence of simultaneous editing according to the embodiment of the present invention.

In the example shown in FIG. 5, the first drawing file is a drawing file whose file name is 3D. The second drawing file is a drawing file whose file name is cbl. When the first drawing file is opened by the operator of the information processing device 1, a pre-editing info file (file name: 3D.info1) is automatically created. Then, when the first drawing file is saved, a post-editing info file (file name: 3D.info2) is automatically created. In addition, when the second drawing file is opened by the operator of the information processing device 2, a pre-editing info file (file name: cbl.info1) is automatically created. Then, when the second drawing file is saved, a post-editing info file (file name: cbl.info2) is automatically created.

Whether the respective drawing files have been edited at the same time can be determined by comparing the creation dates and times of the pre-editing info files and the post-editing info files of the respective drawing files. For example, in FIG. 5, the determination is performed in the following procedure. First, the creation date and time of 3D.info1 is compared with the creation date and time of cbl.info2. If the creation date and time of 3D.info1 is later than the creation date and time of cbl.info2, it is determined that the drawing files have not been edited at the same time. On the other hand, if the creation date and time of 3D.info1 is earlier than the creation date and time of cbl.info2, the creation date and time of 3D.info2 is compared with the creation date and time of cbl.info1. If the creation date and time of 3D.info2 is later than the creation date and time of cbl.info1, it is determined that the drawing files have been edited at the same time. On the other hand, if the creation date and time of 3D.info2 is earlier than the creation date and time of cbl.info1, it is determined that the drawing files have not been edited at the same time and the second drawing file (file name:cbl) has been edited last.

In each of FIGS. 2, 3, and 4A to 4D, the pre-editing info file and the post-editing info file are created when each drawing file is opened and saved, respectively, and it can be determined whether the drawing files have been edited at the same time by comparison of the creation dates and times of info files. Note that the info file created by each of the information processing devices 1 and 2 is transmitted to the server 3 and managed by the server 3. For example, when the operator of the information processing device 1 is trying to open the first drawing file, the device accesses the server 3 to acquire the info file of the second drawing file and performs comparison of the creation dates and times. The info file of the first drawing file have been created at the time of previous editing and the information of the creation date and time is already held, so that it is possible to perform comparison with the acquired information of the creation date and time of the info file of the second drawing file.

<Application Example to Drawing File Editing Application>

Next, an operation of synchronizing the attributes of drawing elements upon opening a drawing file using the drawing file editing application in the information processing device 1 according to the embodiment of the present invention will be described with reference to FIGS. 6A to 6J.

As shown in FIGS. 6A to 6J, an entire product file is configured to include drawing files, info files, and a project file. The drawing files include a 3D harness model (file name: 3D.ltd) and a cable assembly diagram (file name: cbl.epl). It is assumed that the 3D harness model and the cable assembly diagram are mutually associated drawing files, and they include an identical drawing element (for example, a connector with the same identification name). Note that the description will be given while taking an example of the 3D harness model and the cable assembly diagram, but a combination of the 3D harness model and a harness diagram including a plurality of cable assembly diagrams may be used.

The info files include a 3D harness model info file 1 (file name: 3D.info1), a 3D harness model info file 2 (file name: 3D.info2), a cable assembly diagram info file 1 (file name: cbl.info1), and a cable assembly diagram info file 2 (file name: cbl.info2). Here, the 3D harness model info file 1 is a pre-editing info file of the 3D harness model, and the 3D harness model info file 2 is a post-editing info file of the 3D harness model. Similarly, the cable assembly diagram info file 1 is a pre-editing info file of the cable assembly diagram, and the cable assembly diagram info file 2 is a post-editing info file of the cable assembly diagram.

The project file is a file that includes a list of drawing files necessary for manufacturing a cable or a wire harness of one product. Here, the project file includes a project file whose file name is product.epprj.

Figure 6A:
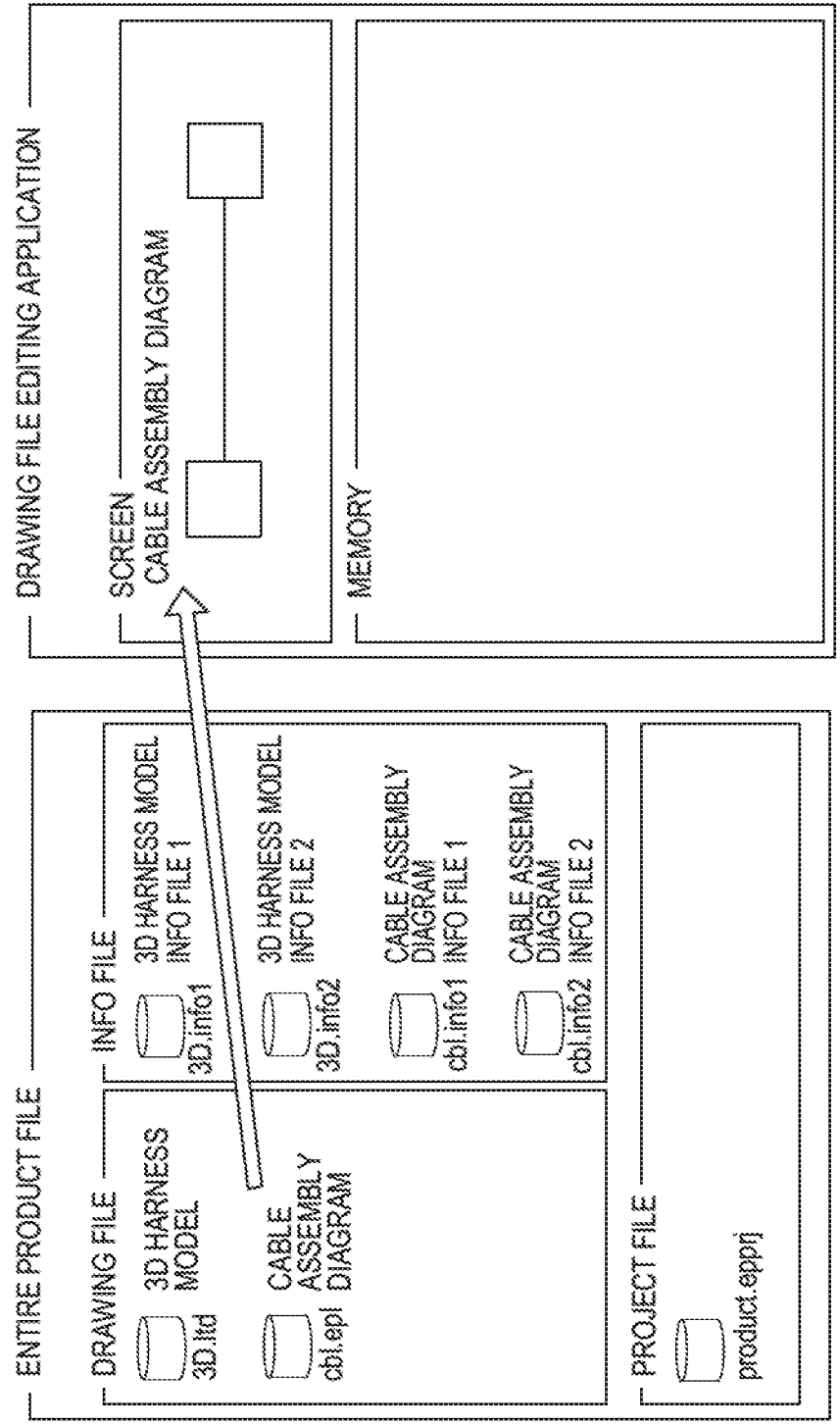
FIG. 6A is a view for explaining an operation example of a drawing editing application according to the embodiment of the present invention.
Figure 6B:
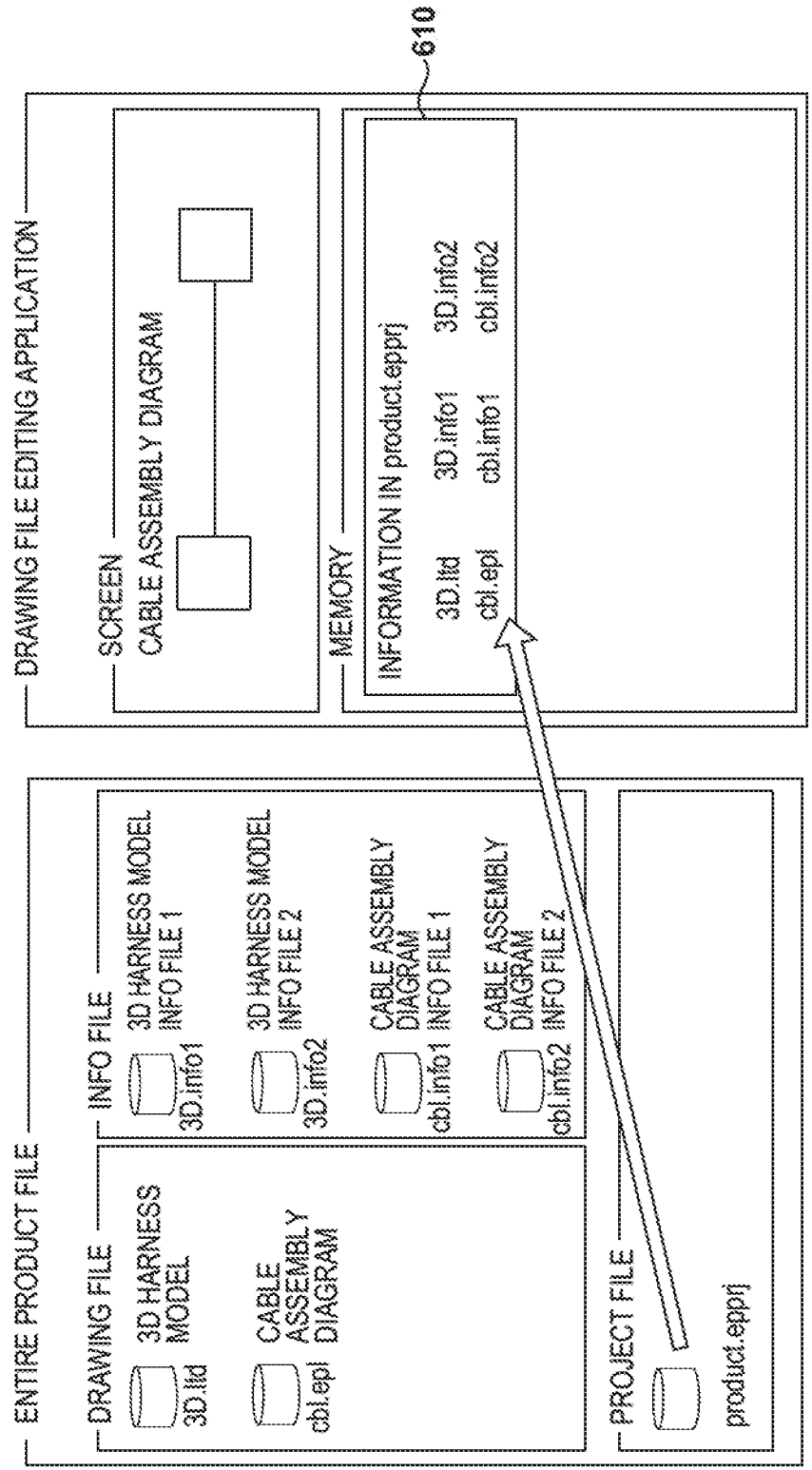
FIG. 6B is a view for explaining the operation example of the drawing editing application according to the embodiment of the present invention.

In FIG. 6A, the operator of the information processing device 1 opens and loads a drawing file (here, the cable assembly drawing) using the drawing file editing application (here, the cable assembly drawing editing application). The cable assembly diagram is displayed on the screen. Then, as shown in FIG. 6B, the project file associated with the drawing file to be opened is loaded into a memory region 610 of the drawing file editing application. The project file product.epprj includes 3D.ltd, 3D.info1, 3D.info2, cbl.epl, cbl.info1, and cbl.info2. 3D.ltd and cbl.epl are mutually associated drawing files. The associated drawing file (the 3D harness model) is edited by the operator of the information processing device 2.

Figure 6C:
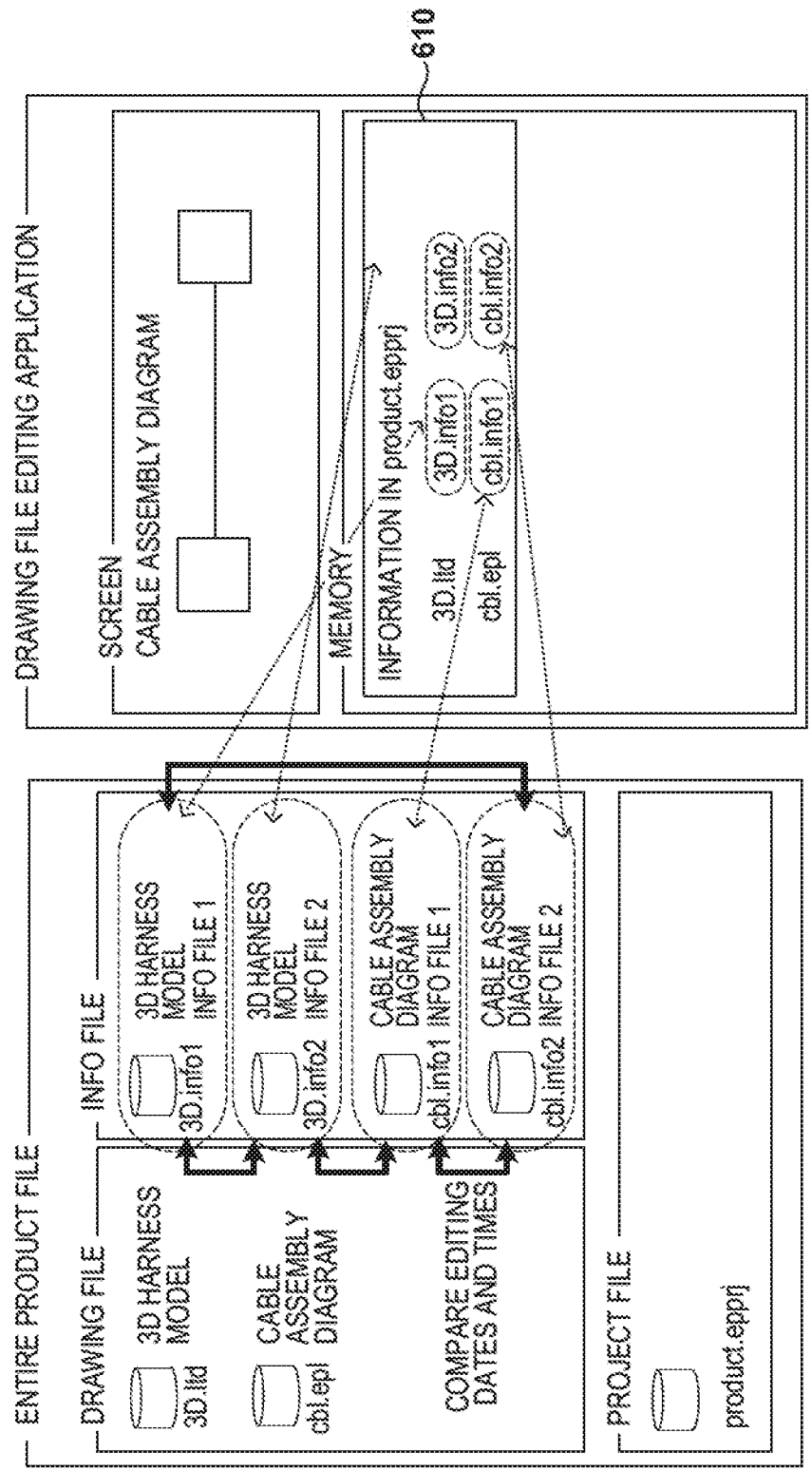
FIG. 6C is a view for explaining the operation example of the drawing editing application according to the embodiment of the present invention.

Then, as shown in FIG. 6C, the creation dates and times of the info files of the drawing files associated with each other in the project file are compared to determine whether the respective drawing files have been edited at the same time (corresponding to the processing in step S202). Here, the creation dates and times of 3D.info1, 3D.info2, cbl.info1, and cbl.info2 are compared with each other. This determination processing can be executed using the method described with reference to FIG. 5.

Figure 6D:
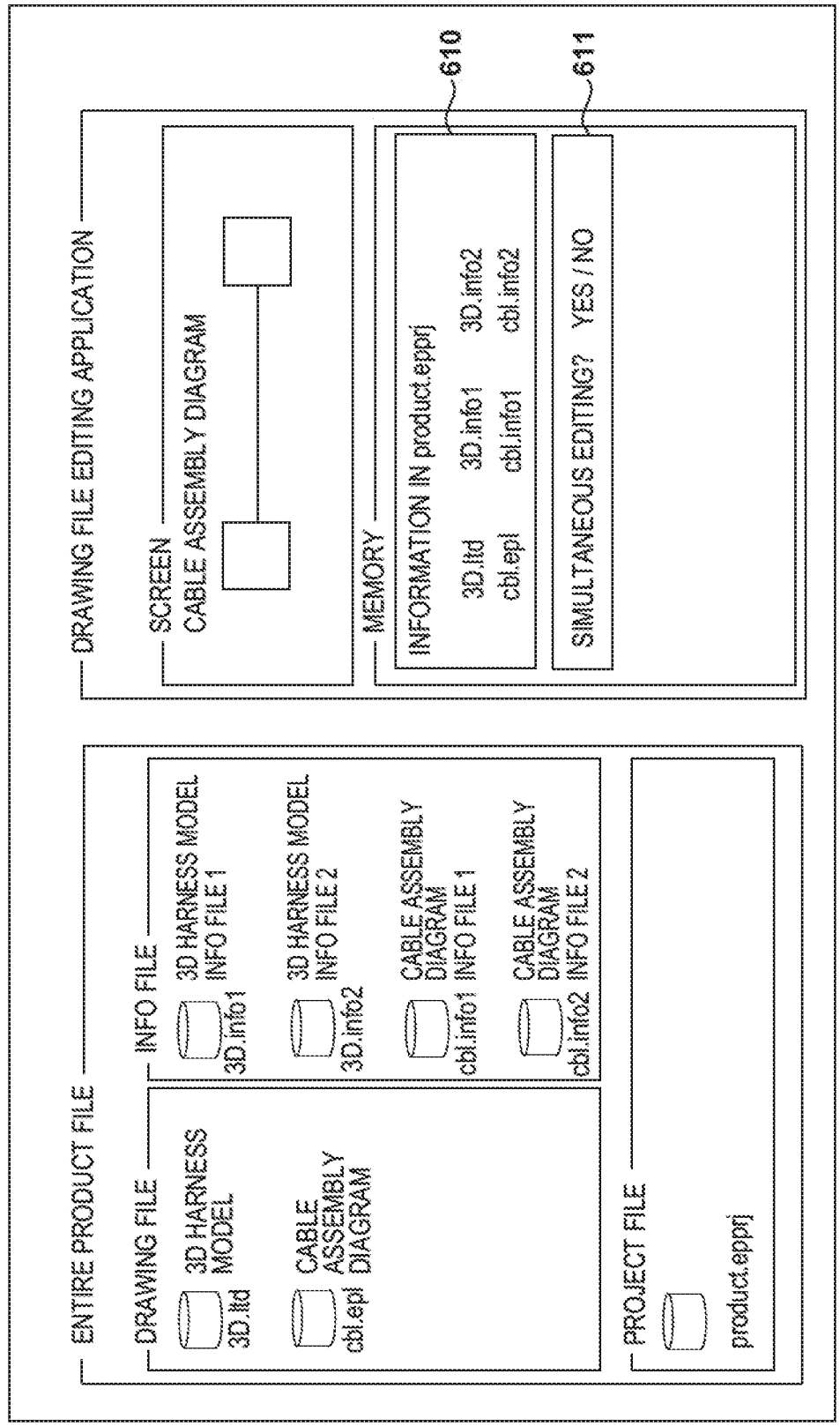
FIG. 6D is a view for explaining the operation example of the drawing editing application according to the embodiment of the present invention.

As a result, if the drawing files have not been edited at the same time, it is determined whether the drawing file to be opened has been edited last (corresponding to the processing in step S203). If the drawing file to be opened has been edited last (corresponding to No in step S203), the drawing file is opened intact (corresponding to the processing in step S205), and the change made by another operator (here, the operator of the information processing device 2) using another drawing file editing application (here, the 3D harness model editing application) is not displayed. Then, as shown in FIG. 6D, the determination result regarding the presence/absence of simultaneous editing (simultaneous editing? Yes/simultaneous editing? No) is recorded in a memory region 611 of the drawing file editing application.

Figure 6E:
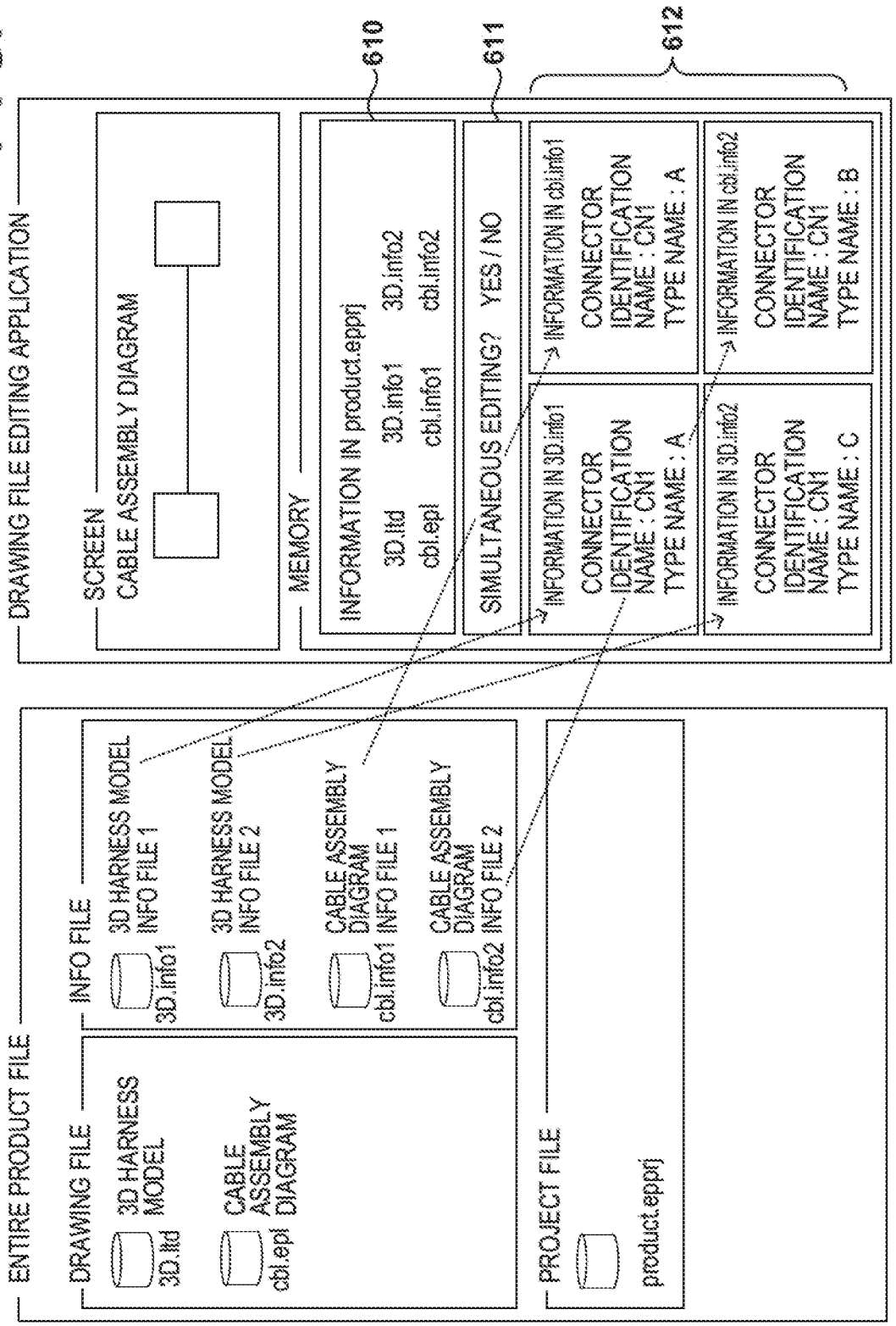
FIG. 6E is a view for explaining the operation example of the drawing editing application according to the embodiment of the present invention.

Subsequently, as shown in FIG. 6E, the info files of the respective drawing files associated with each other in the project file are automatically opened and loaded into a memory region 612 of the drawing file editing application. In the illustrated example, the pre-editing info files (the 3D harness model info file 1 and the cable assembly diagram info file 1) and the post-editing info files (the 3D harness model info file 2 and the cable assembly diagram info file 2) of the 3D harness model and the cable assembly diagram are loaded.

The 3D harness model info file 1 (file name: 3D.info1) includes information of drawing element=connector, attribute=identification name CN1, and type name A. The 3D harness model info file 2 (file name: 3D.info2) includes information of drawing element=connector, attribute=identification name CN1, and type name C. The cable assembly diagram info file 1 (file name: cbl.info1) includes information of drawing element=connector, attribute=identification name CN1, and type name A. The cable assembly diagram info file 2 (file name: cbl.info2) includes information of drawing element=connector, attribute=identification name CN1, and type name B.

Figure 6F:
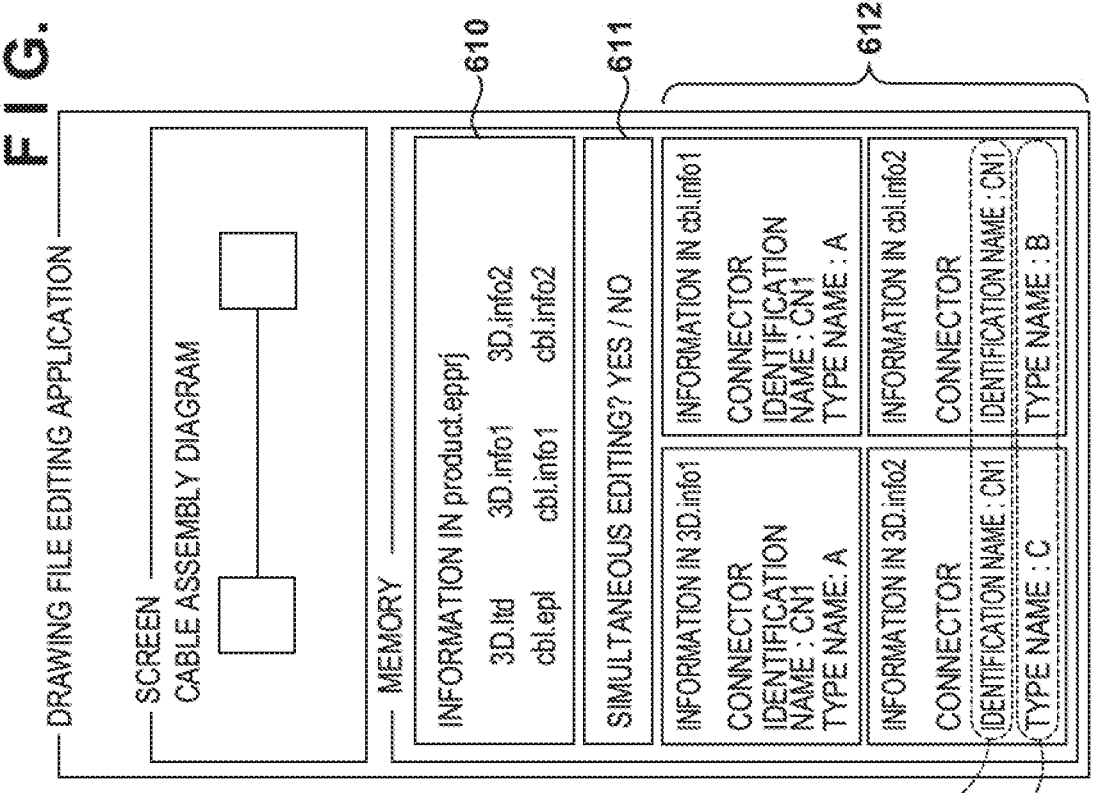
FIG. 6F is a view for explaining the operation example of the drawing editing application according to the embodiment of the present invention.

Then, as shown in FIG. 6F, the post-editing info file (file name: cbl.info2) of the drawing file (the cable assembly diagram) to be opened is compared with the post-editing info file (file name: 3D.info2) of the associated drawing file (the 3D harness model). The key attribute (the identification name in the illustrated example) that serves as an index for determining whether the drawing elements represent identical drawing elements is checked, and the attributes (in the illustrated example, the type names) of the drawing elements having the same key attribute (the same identification name) are compared to check whether the attributes are different (corresponding to the processing in step S204). As a result, in the illustrated example, the type name is C in the post-editing info file of the 3D harness model, whereas the type name is B in the post-editing info file of the cable assembly diagram, so that it can be found that the attributes are different (corresponding to Yes in step S204). Therefore, the attribute having the difference, that is, the type name is extracted.

Figure 6G:
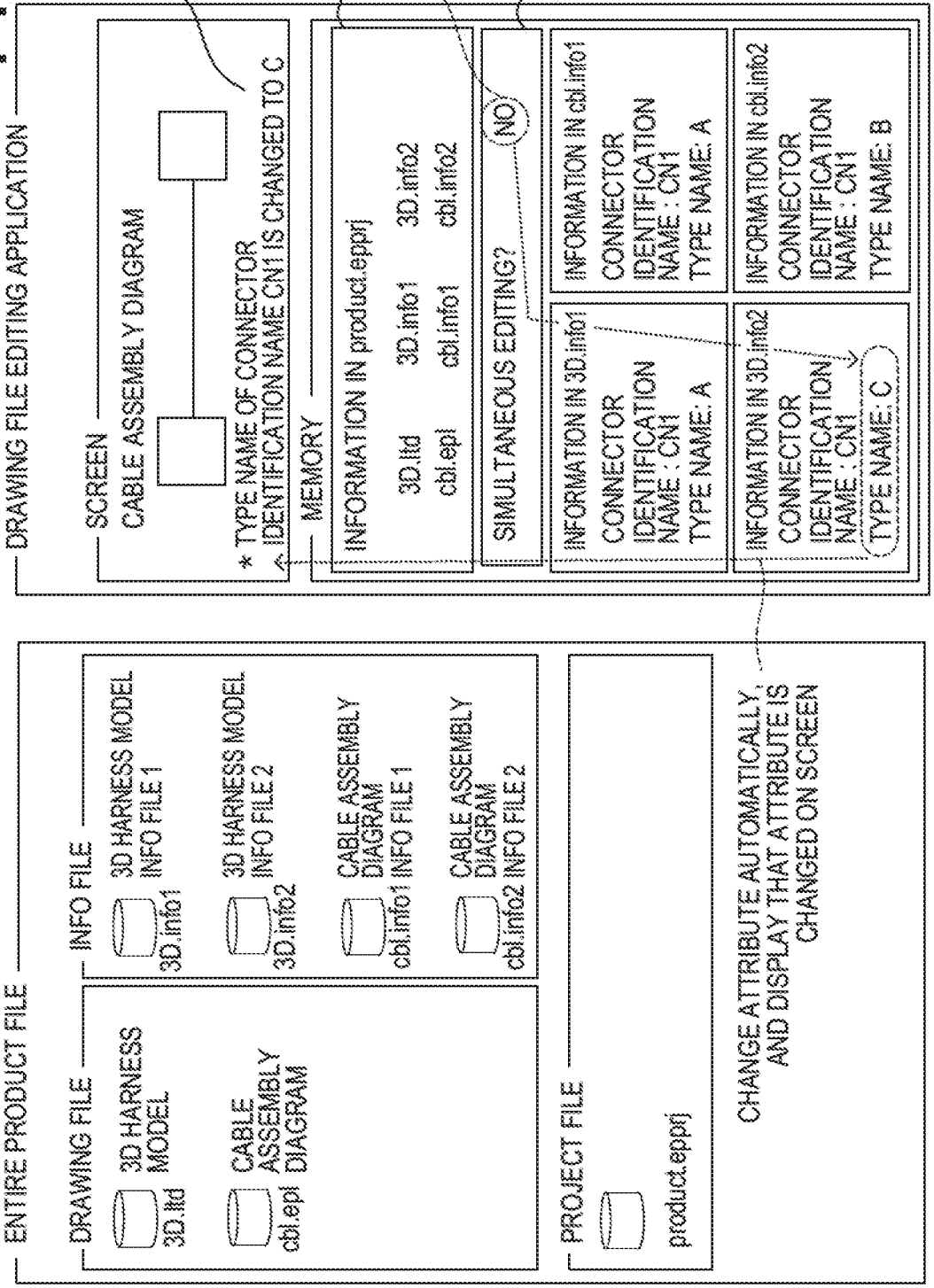
FIG. 6G is a view for explaining the operation example of the drawing editing application according to the embodiment of the present invention.

Further, as shown in FIG. 6G, if the information recorded in the memory region 611 indicates that the drawing files have not been edited at the same time (edited at the same time? No), the information of the attribute (the type name C) changed by the operator of the information processing device 2 by editing the 3D harness model is automatically loaded to change the attribute, and the operator of the information processing device 1 is notified of the change (corresponding to step S206, No in step S301, and the processing in step S305). The notification is performed by, for example, displaying a text 613 ("*The type name of the connector identification name CN1 has been changed to C") on the screen of the drawing file editing application. The text 613 may be highlighted with a color/thickness different from that of other characters on the screen or flickered so that the operator can easily recognize it. Thus, the operator of the information processing device 1 can recognize that editing that influences the own drawing file has been made in the associated drawing file.

Figure 6H:
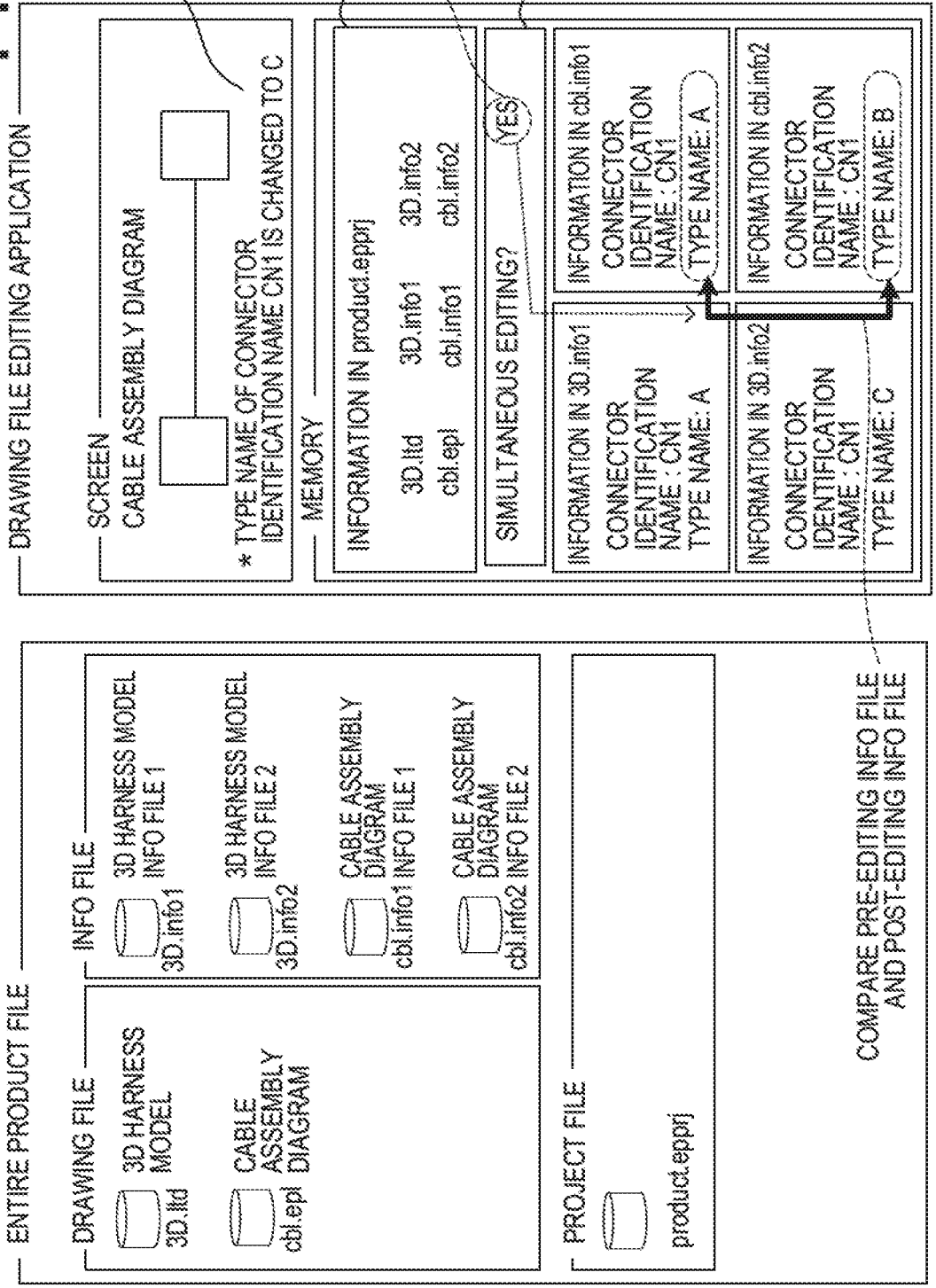
FIG. 6H is a view for explaining the operation example of the drawing editing application according to the embodiment of the present invention.

On the other hand, as shown in FIG. 6H, if the information recorded in the memory region 611 indicates that the drawing files have been edited at the same time (edited at the same time? Yes), the pre-editing info file (the cable assembly diagram info file 1) of the drawing file (the cable assembly diagram) to be opened is compared with the post-editing info file (the cable assembly diagram info file 2) to check whether the attribute (the type name) having the difference has been changed in the previous editing (corresponding to Yes in step S301 and the processing in step S302). Note that the illustrated example shows a case in which the type name of the connector CN1 has been changed from A to B.

Figure 6I:
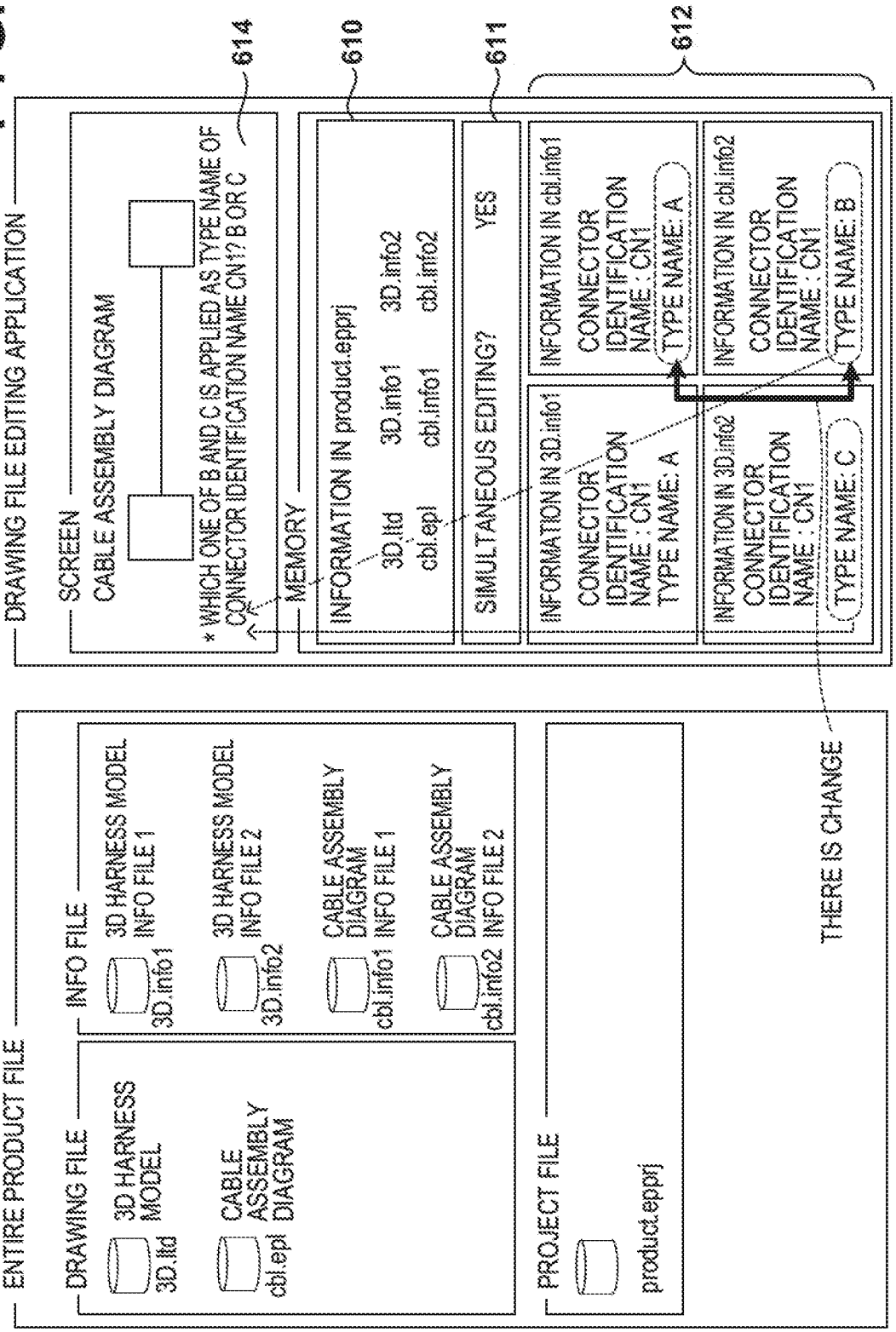
FIG. 6I is a view for explaining the operation example of the drawing editing application according to the embodiment of the present invention.

If the attribute has been changed in the previous editing of the drawing file (the cable assembly diagram) to be opened (if the type name has been changed from A to B), as shown in FIG. 6I, choices are displayed to the operator of the information processing device 1 to check which one of the type name B changed by the operator of the information processing device 1 by editing the cable assembly diagram and the type name C changed by the operator of the information processing device 2 by editing the 3D harness model is selected. For example, the choices are displayed in the form of a text 614 ("*Which one of B and C is applied as the type name of the connector identification name CN1? B or C") (corresponding to the processing in step S303). Alternatively, a window 701 as shown in FIG. 7 may be displayed to prompt the operator of the information processing device 1 to make a selection. In the example shown in FIG. 7, the drawing element having a difference between a plurality of drawing editing applications and its identification name are displayed, and candidates for the updated value are displayed. The operator of the information processing device 1 can make a selection by checking the check box and pressing the apply button. The operator of the information processing device 1 operates the operation unit 201 to make a selection. Then, processing of changing the attribute to the selected attribute (the selected type name) is executed (corresponding to the processing in steps S304 and S306). When the selection operation itself is canceled, the window 701 is closed by pressing the cancel button.

Figure 6J:
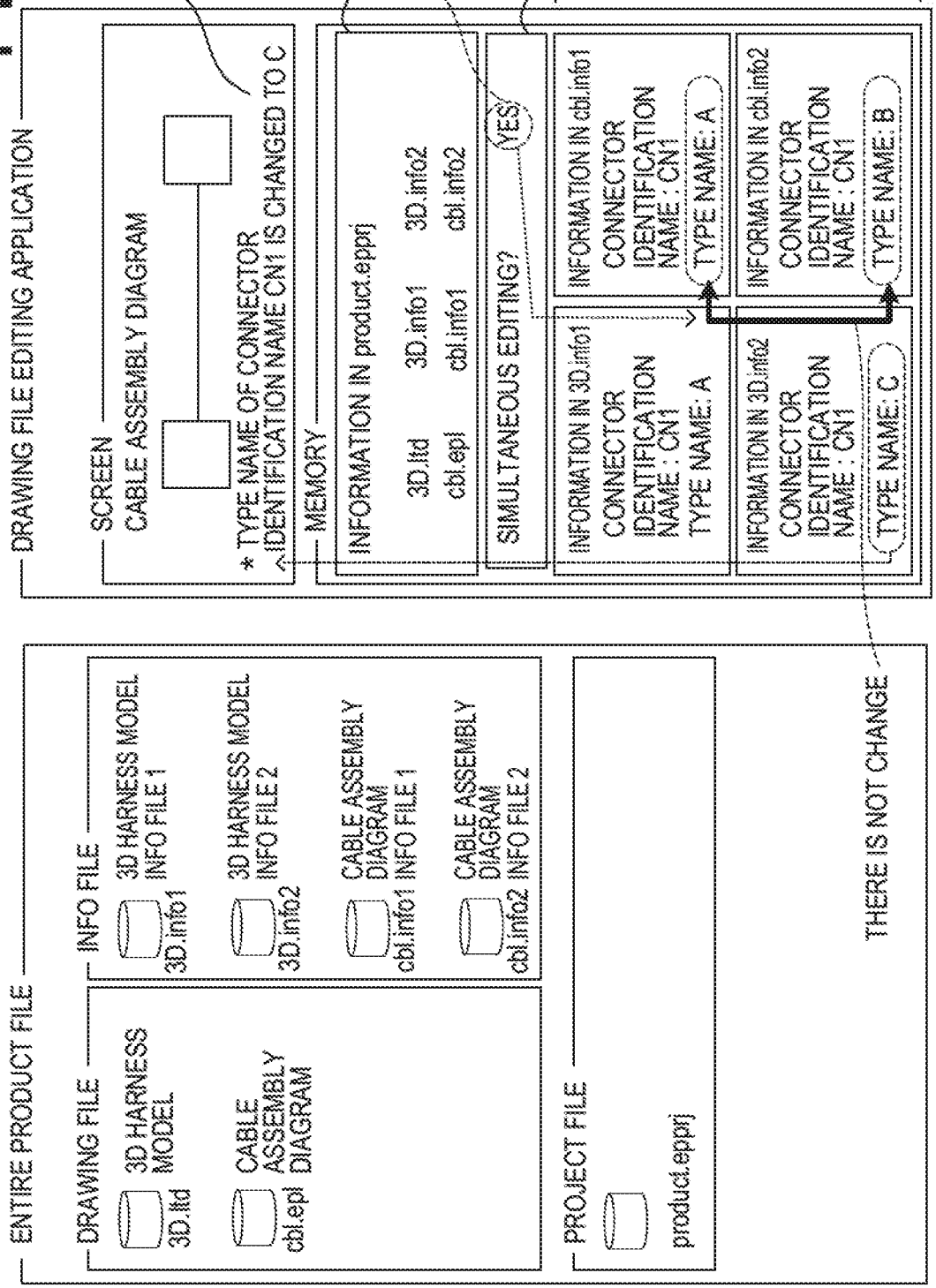
FIG. 6J is a view for explaining the operation example of the drawing editing application according to the embodiment of the present invention.

On the other hand, as shown in FIG. 6J, if the attribute has not been changed in the previous editing of the drawing file (the cable assembly drawing) to be opened (if the type name remains A), information of the attribute (the type name C) changed by the operator of the information processing device 2 by editing the 3D harness model is automatically loaded to change the attribute, and the operator of the information processing device 1 is notified of the change (corresponding to Yes in step S301, No in step S302, and the processing in step S305). The notification is performed by, for example, displaying the text 613 ("*The type name of the connector identification name CN1 has been changed to C") on the screen of the drawing file editing application.

<Application Example to Project Management Application>

Next, in addition to a display example in the drawing file editing application (a display example in a case in which the cable assembly diagram is to be opened), a display example in the project management application will be described. As has been described above, the project file is a file that includes a list of drawing files necessary for manufacturing a cable or a wire harness of one product. The project management application is an application that can register or delete a drawing file in the project file. The projection management application may be opened by the operator of either information processing device 1 or 2, or may be opened by another operator who operates another information processing device.

Figure 8:
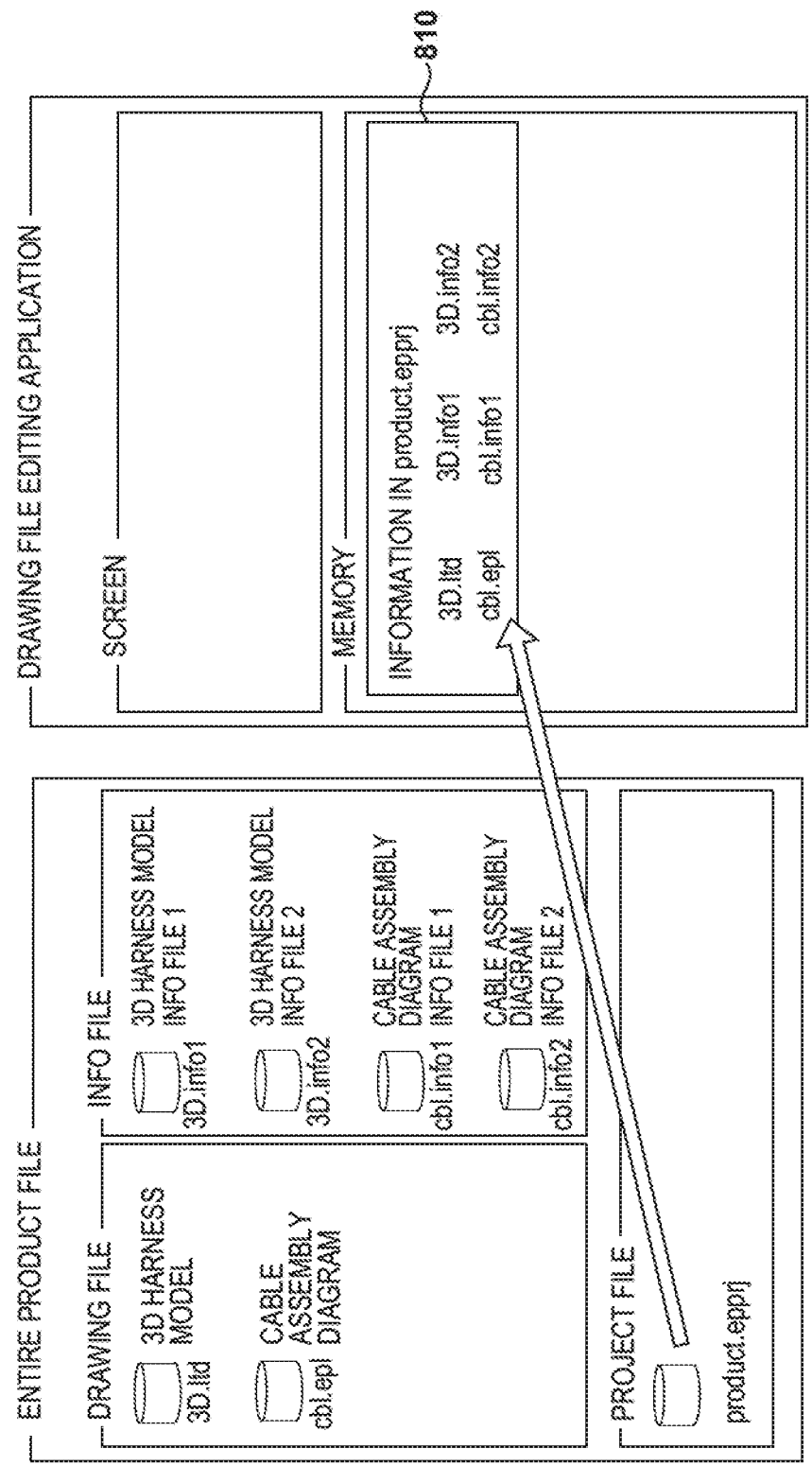
FIG. 8 is a view for explaining a project management application according to the embodiment of the present invention.

As shown in FIG. 8, the project management application is used to open and load the project file. Then, all the drawing files and info files associated with the project file are loaded into a memory region 810. As in FIG. 6B, the project file product.epprj includes 3D.ltd, 3D.info1, 3D.info2, cbl.epl, cbl.info1, and cbl.info2. Then, a window as shown in FIG. 9 is displayed on the screen of the project management application. As shown in a display region 910, the project file includes, as a list of files associated in the project file, 3D.itd and cbl.epl.

In a display region 920, the file name, the date, the status, and the check box for selection of the drawing editing application for the 3D harness model are displayed. In the illustrated example, the file name is "3D.ltd", the date is "2018, Feb. 1", and the status is "latest". "Latest" is displayed when the date is newer than that of other drawing files, or when there is no difference compared with the latest drawing file.

In a display region 930, the file name, the date, the status, and the check box for selection of the drawing editing application for the cable assembly diagram are displayed. In the illustrated example, the file name is "cbl.epl", the date is "2018, Jan. 1", and the status is "different". "Different" is displayed when the date of the drawing file is old and there is a difference compared with the latest drawing file. The display of "different" allows the operator to easily recognize that the attribute has been changed or the like.

A button 940 is a button for updating to the latest information, and when the button 940 is pressed, the info file of the drawing file associated with the project is loaded and the display information is updated based on the info file. A button 950 is a button for editing the file, and when the button 950 is pressed, the drawing editing application for the drawing file with the check box selected is activated, and the selected drawing file can be edited. When the selection operation itself is canceled, the window is closed by pressing a cancel button 960.

In this manner, not only with the drawing editing application but also with the project management application, it is possible to recognize that the attribute is different between the associated drawing files.

As has been described above, if an instruction to open the first drawing file is accepted, the information processing device according to the present embodiment determines whether the first drawing file and the second drawing file associated with the first drawing file have been edited at the same time. Further, it is determined whether the second drawing file has been edited after previous editing of the first drawing file. If the first drawing file and the second drawing file have been edited at the same time or if the first drawing file and the second drawing file have not been edited at the same time but the second drawing file has been edited after the previous editing of the first drawing file, it is determined whether there is a difference between the attributes of identical drawing elements included in the respective drawing files. If there is a difference between the attributes, attribute change processing is executed on the first drawing file. Thus, the consistency between the mutually associated drawing files can be maintained.

Note that in the above-described embodiment, the example has been described in which the operator of the information processing device 1 edits the first drawing file and the operator of the information processing device 2 edits the second drawing file associated with the first drawing file, but the present invention is not limited to this example. For example, the present invention is applicable to a case in which two operators work using one information processing device, one operator edits the first drawing file at a certain timing on the one device, and the other operator edits the second drawing file at another timing.

Further, the present invention is applicable to any drawing files as long as the drawing files each include a common drawing element, are mutually associated, and need to be synchronized with each other. Any kind of drawing file can be used.

The present invention is not limited to the above-described embodiments, and various changes and modifications can be made within the sprit and scope of the present invention. Therefore, to apprise the public of the scope of the present invention, the following claims are made.

The invention claimed is:

1. An information processing device comprising:
a first determination unit configured to determine, if an instruction to open a first drawing file is accepted, whether the first drawing file and a second drawing file associated with the first drawing file have been edited at the same time;

a second determination unit configured to determine whether the second drawing file has been edited after previous editing of the first drawing file;

a third determination unit configured to determine, if the first drawing file and the second drawing file have been edited at the same time or if the first drawing file and the second drawing file have not been edited at the same time but the second drawing file has been edited after the previous editing of the first drawing file, whether there is a difference between attributes of identical drawing elements included in the respective drawing files; and a control unit configured to execute, if there is a difference between the attributes, attribute change processing on the first drawing file, wherein the information processing device is configured to maintain the consistency between the first drawing file and the second drawing file, and wherein the control unit automatically creates a pre-editing info file and a post-editing info file when each of the first drawing file and the second drawing file is opened and saved, respectively, and determines whether the first drawing file and the second drawing file have been edited at the same time by comparison of the creation dates and times of the first drawing file and the second drawing file.

2. The information processing device according to claim 1, wherein if the first drawing file and the second drawing file have not been edited at the same time and the second drawing file has not been edited after the previous editing of the first drawing file, the control unit executes processing of opening the first drawing file intact.

3. The information processing device according to claim 1, wherein if there is no difference between the attributes, the control unit executes processing of opening the first drawing file intact.

4. The information processing device according to claim 1, wherein if there is a difference between the attributes, the control unit automatically executes attribute change processing on the first drawing file unless the first drawing file and the second drawing file have been edited at the same time.

5. The information processing device according to claim 1, wherein if there is a difference between the attributes, the first drawing file and the second drawing file have been edited at the same time, and the attribute having the difference has been changed in the previous editing of the first drawing file, the control unit displays, on a display unit, choices for determining whether attribute changes of the identical drawing elements included in the respective drawing files are applied.

6. The information processing device according to claim 5, further comprising an input acceptance unit configured to accept a selection of one of the choices.

7. The information processing device according to claim 6, wherein the control unit executes attribute change processing on the first drawing file in accordance with the selection.

8. The information processing device according to claim 1, wherein if there is a difference between the attributes but the attribute having the difference has not been changed in the previous editing of the first drawing file even though the first drawing file and the second drawing file have been edited at the same time, the control unit automatically executes attribute change processing on the first drawing file.

9. The information processing device according to claim 1, wherein if the attribute change processing is executed, the control unit displays a change on the display unit.

10. A control method of an information processing device, comprising:

a first determination step of determining, if an instruction to open a first drawing file is accepted, whether the first drawing file and a second drawing file associated with the first drawing file have been edited at the same time;

a second determination step of determining whether the second drawing file has been edited after previous editing of the first drawing file;

a third determination step of determining, if the first drawing file and the second drawing file have been edited at the same time or if the first drawing file and the second drawing file have not been edited at the same time but the second drawing file has been edited after the previous editing of the first drawing file, whether there is a difference between attributes of identical drawing elements included in the respective drawing files; and a control step of executing, if there is a difference between the attributes, attribute change processing on the first drawing file, wherein the information processing device is configured to maintain the consistency between the first drawing file and the second drawing file, and wherein the information processing device automatically creates a pre-editing info file and a post-editing info file when each of the first drawing file and the second drawing file is opened and saved, respectively, and determines whether the first drawing file and the second drawing file have been edited at the same time by comparison of the creation dates and times of the first drawing file and the second drawing file.

11. A non-transitory computer readable storage medium storing a program that causes a computer to perform each step of a control method defined in claim 10.

* * * * *